United States Patent
Zhang et al.

(10) Patent No.: US 10,516,791 B2
(45) Date of Patent: Dec. 24, 2019

(54) INFORMATION PROCESSING SYSTEM, INFORMATION PROCESSING APPARATUS, AND INFORMATION PROCESSING METHOD FOR EXECUTING AN ITERATION OF ONE OR MORE PROCESSES

(71) Applicants: Dongzhe Zhang, Kanagawa (JP); Yuuichiroh Hayashi, Kanagawa (JP); Ryutaro Sakanashi, Kanagawa (JP)

(72) Inventors: Dongzhe Zhang, Kanagawa (JP); Yuuichiroh Hayashi, Kanagawa (JP); Ryutaro Sakanashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

(21) Appl. No.: 15/439,290

(22) Filed: Feb. 22, 2017

(65) Prior Publication Data
US 2017/0255486 A1    Sep. 7, 2017

(30) Foreign Application Priority Data

Mar. 4, 2016  (JP) .................................. 2016-042843
Mar. 15, 2016 (JP) .................................. 2016-050598
Dec. 26, 2016 (JP) .................................. 2016-250774

(51) Int. Cl.
*G06F 9/46*        (2006.01)
*H04N 1/00*        (2006.01)
*H04N 1/21*        (2006.01)

(52) U.S. Cl.
CPC ..... *H04N 1/00204* (2013.01); *H04N 1/00973* (2013.01); *H04N 1/21* (2013.01); *H04N 2201/0094* (2013.01)

(58) Field of Classification Search
None
See application file for complete search history.

(56) References Cited

U.S. PATENT DOCUMENTS 8,111,288 B2    2/2012 Fujimori et al.
8,327,362 B2    12/2012 Yagi
(Continued)

FOREIGN PATENT DOCUMENTS

JP    2009-146075    7/2009
JP    2010-128948    6/2010
(Continued)

OTHER PUBLICATIONS

PReS; PReS Workflow User Guide v8.1, Jul. 23, 2015 (Year: 2015).*

*Primary Examiner* — Bing Zhao
(74) *Attorney, Agent, or Firm* — IPUSA, PLLC

(57) ABSTRACT

An information processing system includes a memory and processors. The memory stores flow information and flow identification information for each process sequence performed by using electronic data. The flow information defines program identification information identifying programs for executing the process sequence, and an execution order of the programs. The processors execute computer-executable instructions stored in the memory to execute a process including receiving information relating to the electronic data and the flow identification information, from a device coupled to the system; acquiring the flow information stored in association with the received flow identification information; and executing the process sequence based on the information relating to the electronic data, by executing the programs identified by the program identification information defined in the acquired flow information, in the execution order. When the process sequence includes an iteration of processes, the processes are repeatedly executed according to a condition of the iteration.

11 Claims, 35 Drawing Sheets

(56) References Cited

U.S. PATENT DOCUMENTS

| | | | |
|---|---|---|---|
| 8,856,291 B2 | 10/2014 | Bartlett et al. | |
| 2006/0229923 A1* | 10/2006 | Adi | G06Q 10/06 705/7.27 |
| 2012/0117570 A1* | 5/2012 | Ozaki | G06Q 10/06 718/102 |
| 2016/0241724 A1 | 8/2016 | Sugimura et al. | |

FOREIGN PATENT DOCUMENTS

| | | |
|---|---|---|
| JP | 5112085 | 1/2013 |
| JP | 2015-512099 | 4/2015 |
| JP | 2016-154000 | 8/2016 |

* cited by examiner

FIG.5A

| COMMON I/F | SUMMARY |
|---|---|
| /EXTERNAL STORAGE NAME/process/file | ACQUIRE FILE FROM SPECIFIED STORAGE SERVICE |
| /EXTERNAL STORAGE NAME/process/folder | STORE FILE IN SPECIFIED STORAGE SERVICE |
| ... | ... |

FIG.5B

| UNIQUE I/F | SUMMARY |
|---|---|
| /EXTERNAL STORAGE NAME/process/extension/attach | ADD FILE TO DOCUMENT STORED IN SPECIFIED STORAGE SERVICE |
| ... | ... |

FIG.5C

| COMMON I/F | SUMMARY |
|---|---|
| /EXTERNAL STORAGE NAME/data/files | ACQUIRE FILE LIST FROM SPECIFIED STORAGE SERVICE |
| /EXTERNAL STORAGE NAME/data/folders | ACQUIRE FOLDER LIST FROM SPECIFIED STORAGE SERVICE |
| ... | ... |

FIG.5D

| UNIQUE I/F | SUMMARY |
|---|---|
| /EXTERNAL STORAGE NAME/data/extension/images | ACQUIRE IMAGE FILE LIST FROM SPECIFIED STORAGE SERVICE |
| ... | ... |

FIG.7

| DATA FORMAT BEFORE CONVERSION | DATA FORMAT AFTER CONVERSION | FORMAT CONVERSION TO BE GENERATED |
|---|---|---|
| InputStream | LocalFilePath | FIRST FORMAT CONVERSION |
| LocalFilePath | File | SECOND FORMAT CONVERSION |
| ... | ... | ... |

3000

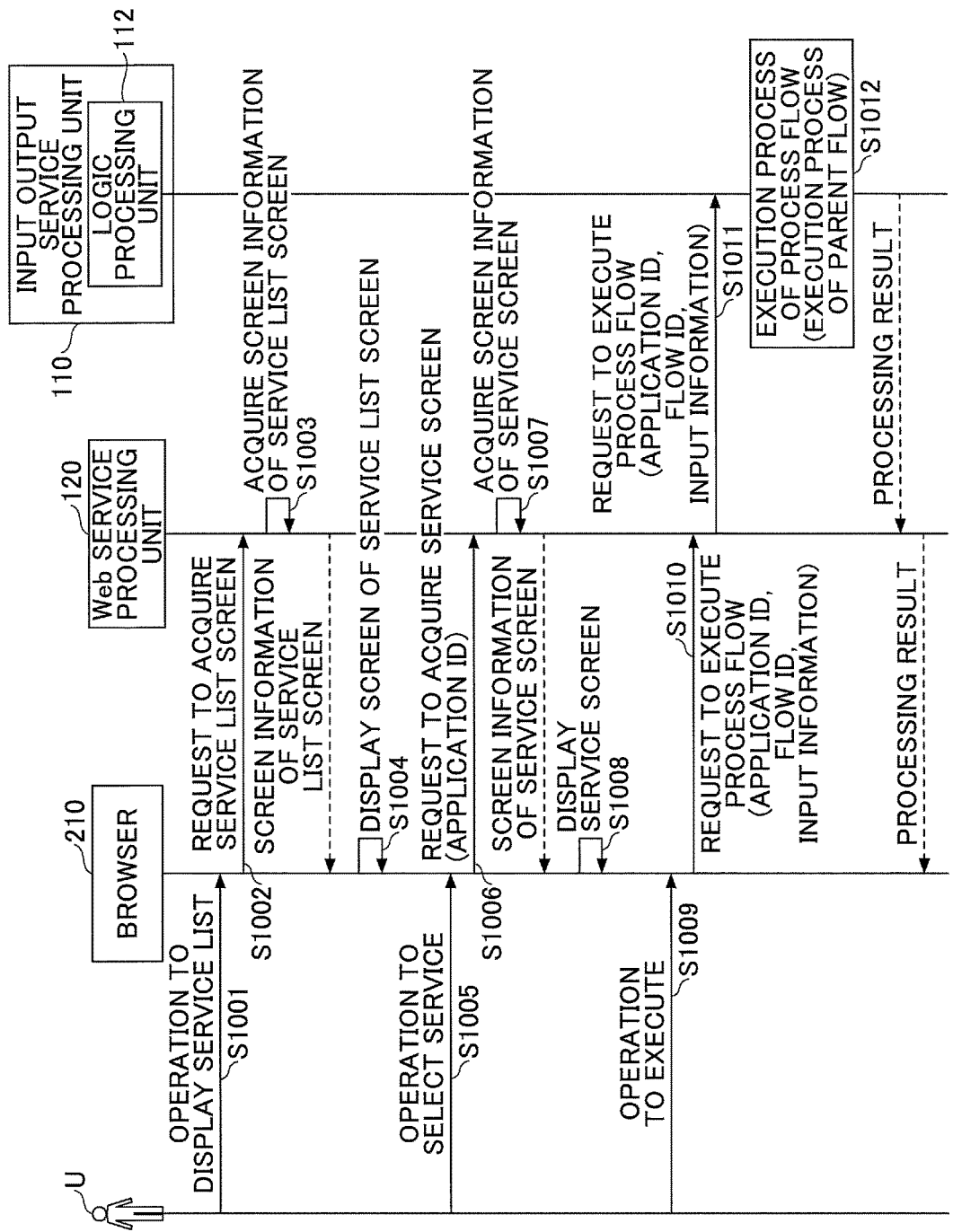

FIG.14

```
"result":{
  "getFileList":{
    "url[0]":"http://service_a.com/user1/file20150228.jpg",
    "url[1]":"http://service_a.com/user1/file20150214.jpg",
    .
    .
    .
    "url[N-1]":"http://service_a.com/user1/file20141228.jpg",
    "size":"N"
  }
}
```

```
"flowid":"flow001",
"flowDetails":[
  (SNIP)                                                  1112
  "component":"iterate",
  "parameters":{
    "useOriginalFile":"true",  }1127
    "flowid":"flow101",        }1121              1124
    "parameterList":[
      {                                           1125
        "getFile":{
          "location":"${result.getFileList.url[0]}"
        },
        "ocr":{
          "language":"English"
        }
      },
      {                                           1126
        "getFile":{
          "location":"${result.getFileList.url[1]}"
        },
        "ocr":{
          "language":"Japanese"
        }
      }
    ],
  }
  (SNIP)
]
```
1100

FIG.21

```
"flowid":"flow001",
"flowDetails":[
  (SNIP)
  {                                                           ⌐1112
    "component":"iterate",
    "parameters":{
      "flowid":"flow101",
      "continueCondition":"(CONDITIONAL EXPRESSION)",  }1128
      "flowDetails":[
        {
          "component":"getFile",
          "parameters":{
            "location":"#{result.getFileList.url[index]}"
          }
        },
        {
          "component":"ocr",
          "parameters":{
            "language":"English"
          }
        }
      ],
      "numberOfIterations":"#{result.getFileList.size}"
    }
  },
  (SNIP)
]
```

```
"flowid":"flow002",                1201              1202
"flowDetails":[
    {                          1211
        "component":"getFileList",
        "parameters":{
            "storage":null
        }
    },
    {                          1212
        "component":"execute",
        "parameters":{
            "flowid":"flow102",    1221
        }
    },
    {                          1213
        "component":"sendMail",
        "parameters":{
            "to":null
        }
    }
]
```
1100

FIG.32

```
"flowid":"flow001",
"flowDetails":[
  (SNIP)
  {                                                          ⁄1212
    "component":"execute",
    "parameters":{
      "flowid":"flow102",
      "executeCondition":"(CONDITIONAL EXPRESSION)", }-1222
    }
  },
  (SNIP)
]
```
1100

INFORMATION PROCESSING SYSTEM, INFORMATION PROCESSING APPARATUS, AND INFORMATION PROCESSING METHOD FOR EXECUTING AN ITERATION OF ONE OR MORE PROCESSES

CROSS-REFERENCE TO RELATED APPLICATION

The present application claims priority under 35 U.S.C. § 119 of Japanese Patent Application No. 2016-042843, filed on Mar. 4, 2016, Japanese Patent Application No. 2016-050598, filed on Mar. 15, 2016, and Japanese Patent Application No. 2016-250774, filed on Dec. 26, 2016, the contents of which are incorporated herein by reference in their entirety.

BACKGROUND OF THE INVENTION

1. Field of the Invention

The present invention relates to an information processing system, an information processing apparatus, and an information processing method.

2. Description of the Related Art

In recent years, various kinds of external services have been provided by cloud computing, etc. For example, there is known an external service for storing electronic data specified by a user, in an external storage, etc.

Furthermore, there is known a technology of generating an office work flow for controlling a component for executing various processes, based on an office work flow model defined in advance (see, for example, Patent Document 1). In such a technology, components are combined by the generated office work flow, and a sequence of processes for implementing an office work process is executed.

Patent Document 1: Japanese Patent No. 5112085

SUMMARY OF THE INVENTION

An aspect of the present invention provides an information processing system, an information processing apparatus, and an information processing method in which one or more of the above-described disadvantages are reduced.

According to one aspect of the present invention, there is provided an information processing system including one or more information processing apparatuses configured to implement various functions of the information processing system, the information processing system including a memory configured to store flow information and flow identification information identifying the flow information in association with each other for each sequence of processes performed by using electronic data, the flow information defining first program identification information identifying one or more programs for respectively executing the processes included in the sequence of processes, the flow information also defining a first execution order of executing the one or more programs, and computer-executable instructions; and one or more processors configured to execute the computer-executable instructions such that the one or more processors execute a process including receiving, over a communication channel, information relating to the electronic data used in the sequence of processes and the flow identification information, from one of one or more devices coupled to the information processing system; acquiring the flow information stored in association with the received flow identification information, among the flow information stored in the memory; and executing the sequence of processes using the electronic data based on the information relating to the electronic data, by respectively executing the one or more programs identified by the first program identification information defined in the acquired flow information, in the first execution order defined in the acquired flow information, wherein when the sequence of processes includes an iteration of one or more processes, the executing includes repeatedly executing the one or more processes according to a condition of the iteration.

BRIEF DESCRIPTION OF THE DRAWINGS

Other objects, features and advantages of the present invention will become more apparent from the following detailed description when read in conjunction with the accompanying drawings, in which:

FIGS. 5A through 5D illustrate examples of a common interface (I/F) and a unique I/F according to the first embodiment of the present invention;

FIG. 7 illustrates an example of a format conversion information table according to the first embodiment of the present invention;

FIG. 10 is a sequence diagram of an example of the overall process performed when using the "OCR delivery 1" service according to the first embodiment of the present invention;

FIG. 14 illustrates an example of resource management information according to the first embodiment of the present invention;

FIG. 19 illustrates another example of process flow information defining the process flow for implementing the "OCR delivery 1" service according to the first embodiment of the present invention (part 1);

FIG. 21 illustrates another example of process flow information defining the process flow for implementing the "OCR delivery 1" service according to the first embodiment of the present invention (part 2);

FIG. 24 illustrates an example of process flow information in which a process flow (parent flow) for implementing the "OCR delivery 2" service is defined, according to the second embodiment of the present invention;

FIG. 32 illustrates another example of the process flow information in which a process flow (parent flow) for implementing the "OCR delivery 2" service is defined, according to the second embodiment of the present invention.

DETAILED DESCRIPTION OF THE PREFERRED EMBODIMENTS

In the technology of the related art, when the sequence of processes includes an operation of repeating one or more processes (iteration), there have been cases where the sequence of processes cannot be executed. For example, it has not been possible to dynamically change the number of times of repeating the one or more processes, according to a processing result of a certain component.

A problem to be solved by an embodiment of the present invention is to execute a sequence of processes including iteration.

Embodiments of the present invention will be described by referring to the accompanying drawings.

First Embodiment

System Configuration

Figure 1:
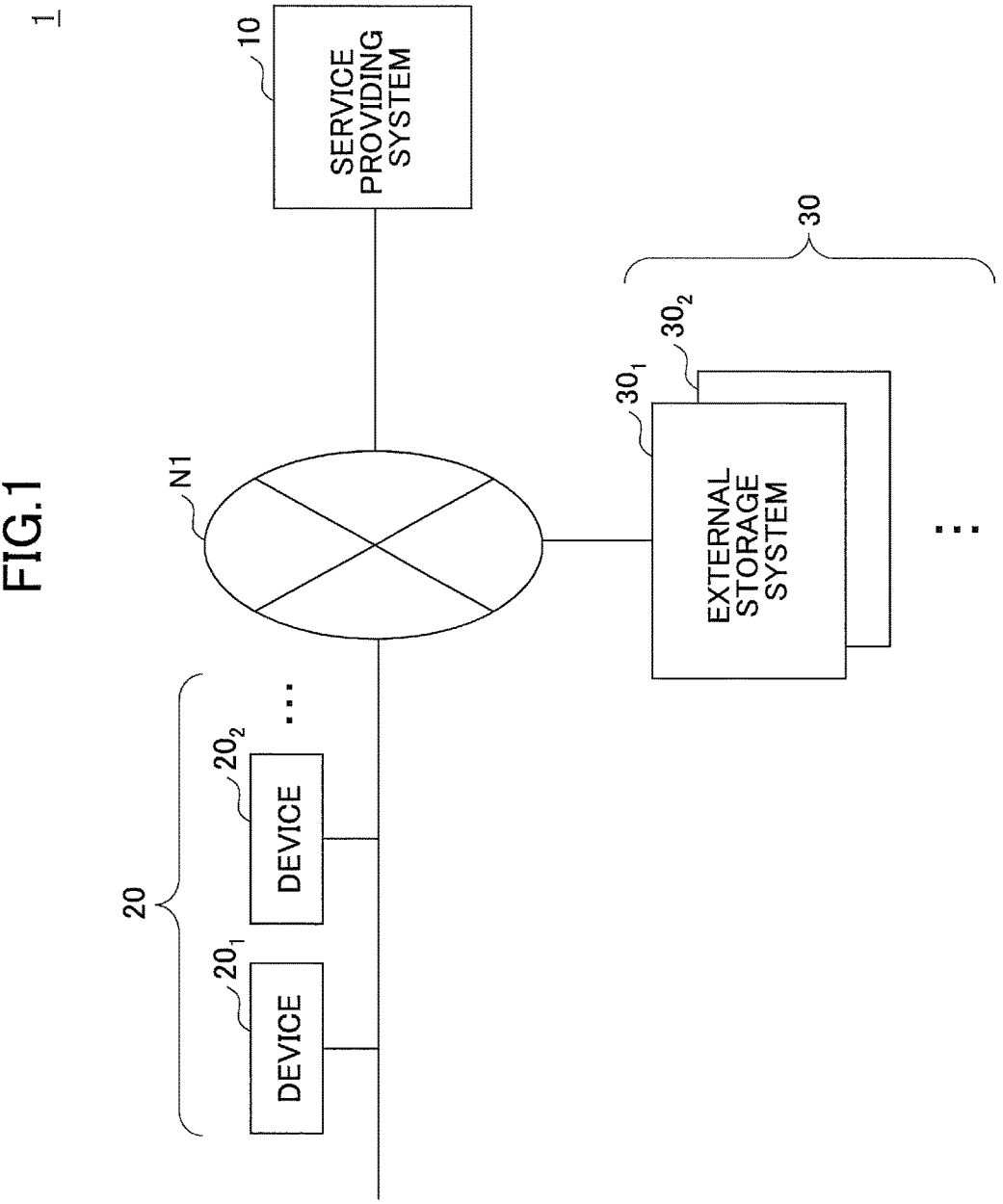
FIG. 1 is a diagram illustrating an exemplary system configuration of an information processing system according to a first embodiment of the present invention.

Referring to FIG. 1, an information processing system 1 according to the first embodiment is described. FIG. 1 is a diagram illustrating an exemplary system configuration of the information processing system 1 according to the first embodiment.

The information processing system 1 illustrated in FIG. 1 includes a service providing system 10, a device 20, and an external storage system 30, which are communicably coupled through a wide area network N1 such as the Internet.

The service providing system 10 is implemented by at least one information processing apparatus and provides various services implemented by a sequence of processes, which cooperate with an external service such as cloud service via the network N1.

The service provided by the service providing system 10 according to the first embodiment is specifically described below. Hereinafter, the sequence of processes is referred to as a "process flow".

Although the external service to be described in the first embodiment is specifically the cloud service, the external service is not limited to this cloud service. For example, the first embodiment may be applied to various external services such as a service provided by an application service provider (ASP) and a web service, which are provided via the network.

The devices 20 are various electronic devices used by a user. That is, the device 20 is, for example, an image forming apparatus such as a multifunction peripheral (MFP), a personal computer (PC), a projector, an electronic whiteboard, a digital camera, or the like. The user uses the device 20 to use various services provided by the service providing system 10.

Hereinafter, when each of the plurality of devices 20 is distinguished, a suffix is added such as a "device $20_1$" and a "device $20_2$".

The external storage system 30 is a computer system providing a cloud service called a storage service (or an online storage). The storage service is a service of lending a memory area of a storage of the external storage system 30.

Hereinafter, when each of the plurality of external storage systems 30 is distinguished, a suffix is added such as an "external storage system $30_1$" and an "external storage system $30_2$". Further, the name of the storage service provided by the external storage system $30_1$ is a "storage A", and the name of the storage service provided by the external storage system $30_2$ is a "storage B".

The external storage system 30 may be a system implemented by a plurality of information processing apparatuses.

The configuration of the information processing system 1 illustrated in FIG. 1 is an example and may have other configurations. For example, the information processing system 1 according to the first embodiment includes various devices, each of which performs at least one of an input and an output of the electronic data. These devices may use various services provided by the service providing system 10.

<Hardware Configuration>

Figure 2:
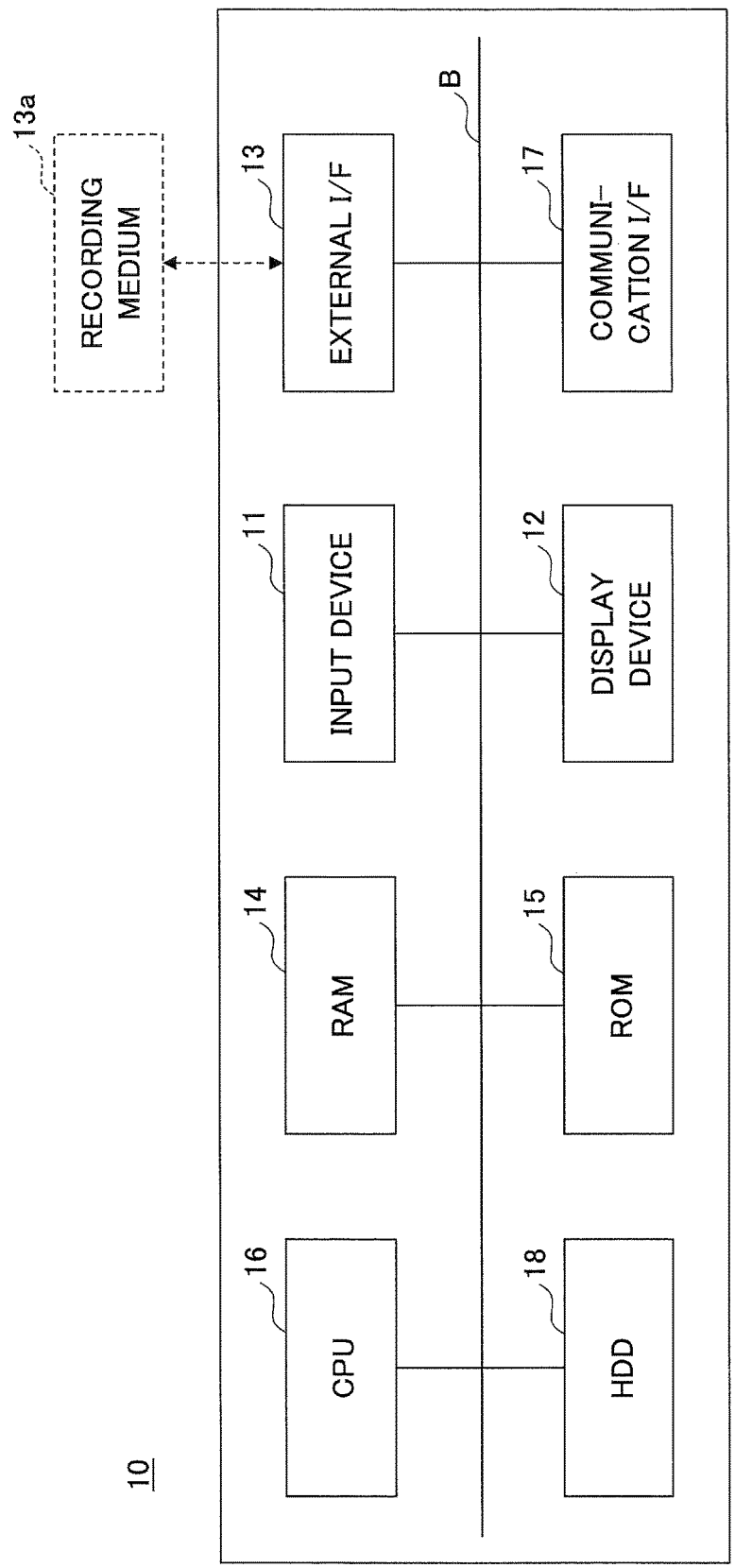
FIG. 2 is a diagram illustrating a hardware configuration of an exemplary service providing system according to the first embodiment of the present invention.

Referring to FIG. 2, described next is the hardware configuration of the service providing system 10 included in the information processing system 1 according to the first embodiment. FIG. 2 is a diagram illustrating the hardware configuration of an exemplary service providing system 10 according to the first embodiment.

The service providing system 10 illustrated in FIG. 2 includes an input device 11, a display device 12, an external interface (I/F) 13, and a random access memory (RAM) 14. Further, the service providing system 10 includes a read only memory (ROM) 15, a central processing unit (CPU) 16 (an example of one or more processors), a communication interface (I/F) 17, and a hard disk drive (HDD) 18. Each of the ROM 15, the CPU 16, a communication I/F 17, and the HDD 18 is connected by the bus B.

The input device 11 includes a keyboard, a mouse, a touch panel, and the like, by which the user inputs various operation signals. The display device 12 includes a display or the like to display a processing result acquired by the service providing system 10. At least one of the input device 11 and the display device 12 may be in a mode of being coupled to the service providing system 10 so as to be used.

The communication I/F 17 is an interface provided to couple the service providing system 10 with the network N1. Thus, the service providing system 10 can communicate with another device through the communication I/F 17.

The HDD 18 is a non-volatile memory device that stores programs and data. The program and data stored in the HDD 18 are an operating system (OS), which is basic software controlling the entire service providing system 10, application software providing various functions in the OS, and so on.

The service providing system 10 may use a drive device (e.g., a solid state drive (SSD)) using a flash memory as a memory medium in place of the HDD 18. Further, the HDD 18 administers the stored program and the stored data using at least one of a predetermined file system and a predetermined database (DB).

The external I/F 13 is an interface with an external device. The external device includes a recording medium 13a and so on. With this, the service providing system 10 can read information from the recording medium 13a and write information to the recording medium 13a through the external I/F 13. The recording medium 13a is a flexible disk, a CD, a DVD, an SD memory card, a USB memory, or the like.

The ROM 15 is a non-volatile semiconductor memory that can store a program or data even when a power source is powered off. The ROM 15 stores a program and data such as a basic input/output system (BIOS), an operating system (OS) setup, a network setup, or the like, which are executed at a time of starting up the service providing system 10. The RAM 14 is a volatile semiconductor memory configured to temporarily store the program and the data.

The CPU 16 reads the program and/or data from the memory device such as the ROM 15 and the HDD 18. The read program or the read data undergo a process to thereby realize a control or a function of the entire service providing system 10.

The service providing system 10 of this embodiment can realize various processes described below by having the above hardware configuration of the service providing system 10 illustrated in FIG. 2.

Figure 3:
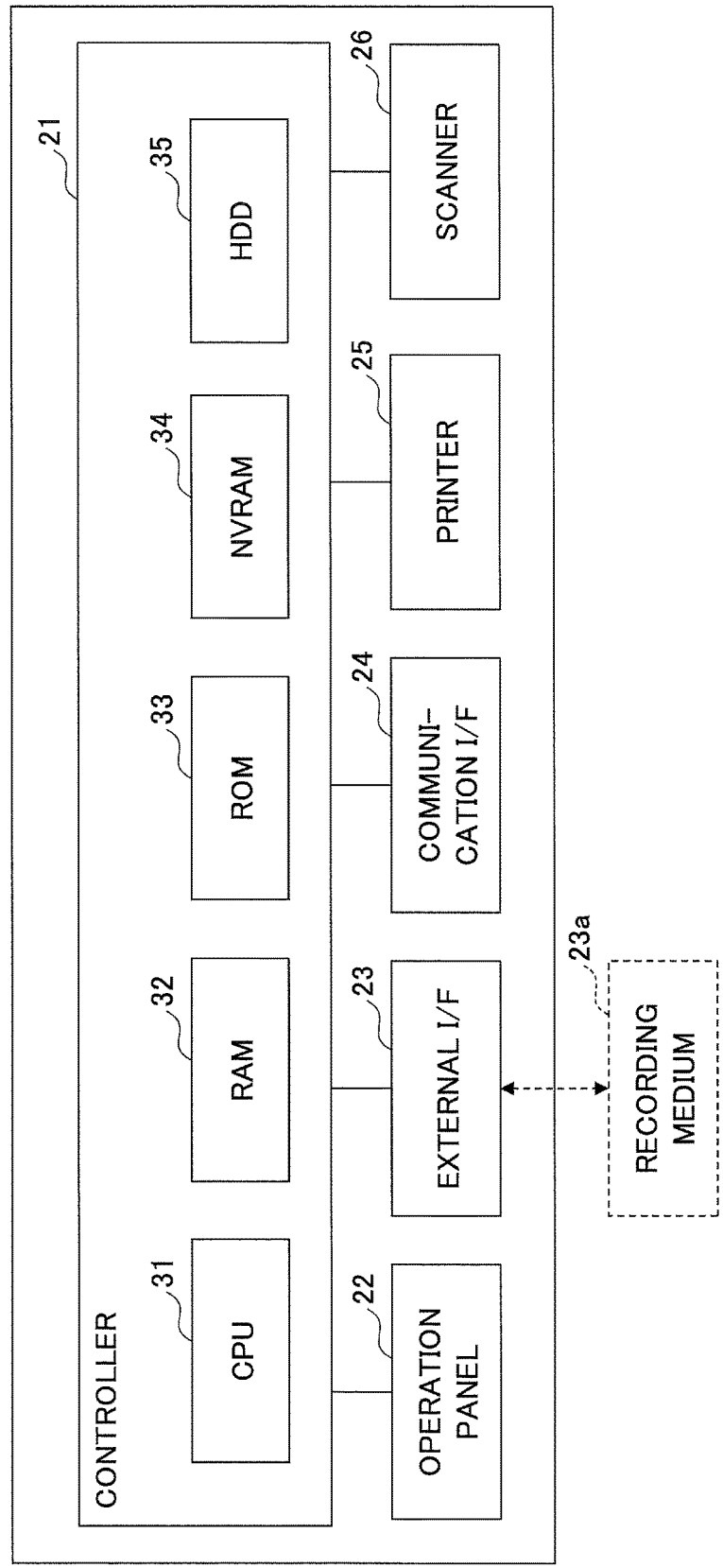
FIG. 3 is a diagram illustrating a hardware configuration of an exemplary device according to the first embodiment of the present invention.

Referring to FIG. 3, described next is the hardware configuration of an image forming apparatus, which is the device 20 included in the information processing system 1 of the embodiment. FIG. 3 is a diagram illustrating a hardware configuration of an exemplary device 20 according to the first embodiment.

The device 20 illustrated in FIG. 3 includes a controller 21, an operation panel 22, an external interface (I/F) 23, a communication I/F 24, a printer 25, and a scanner 26. The controller 21 includes a central processing unit (CPU) 31 (an example of one or more processors), a random access memory (RAM) 32, a read only memory (ROM) 33, a non-volatile random access memory (NVRAM) 34, and a hard disk drive (HDD) 35.

The ROM 33 is a non-volatile semiconductor memory that stores various programs and data. The RAM 32 is a volatile semiconductor memory configured to temporarily store the program and the data. For example, setup information or the like is stored in the NVRAM 34. The HDD 35 is a non-volatile memory device that stores the various programs and data.

The CPU 31 reads the program, the data, setup information, or the like into the RAM 32 from the ROM 33, the NVRAM 34, the HDD 35, or the like, and executes the process. Thus, the CPU 31 is an arithmetic device implementing control and a function of the entire device 20.

The operation panel 22 includes an input unit configured to receive an input from the user and a display unit configured to display. The external I/F 23 is an interface with the external device. The external device includes a recording medium 23a and so on. With this, the device 20 can perform at least one of reading information from the recording medium 23a through the external I/F 23 and writing the information to the recording medium 23a through the external I/F 23. The recording medium 23a is, for example, an IC card, a flexible disk, a compact disc (CD), a digital versatile disc (DVD), a secure digital (SD) memory card, and a universal serial bus (USB) memory.

The communication I/F 24 is an interface coupling the device 20 with the network. Thus, the device 20 can perform data communications through the communication I/F 24. The printer 25 is provided to print data. The scanner 26 is a reading device that reads an original and generates an electronic file (an image file).

The device 20 according to the first embodiment includes a hardware configuration illustrated in FIG. 3 to realize various processes described below.

<Service Provided by Service Providing System>

The service provided by the service providing system 10 according to the first embodiment is described. Hereinafter, a description is given of a case where the device 20 is an image forming apparatus.

For example, the service providing system 10 according to the present embodiment provides a service of acquiring a storage destination list of electronic files in the external storage system 30, acquiring an electronic file based on the acquired list, performing an Optical Character Recognition (OCR) process on the acquired electronic file, and delivering the electronic file by mail.

The service providing system 10 according to the present embodiment is described as providing the above-described service (in the following, also referred to as an "OCR delivery 1" service, or simply as "OCR delivery 1").

However, the service provided by the service providing system 10 is not limited to the above. For example, the service providing system 10 may provide a service of acquiring a storage destination list of electronic files in the external storage system 30, acquiring an electronic file based on the acquired list, editing (for example, adding or deleting predetermined information, etc.) the acquired electronic file, and delivering the electronic file by mail.

Furthermore, for example, the service providing system 10 may provide a service of acquiring a storage destination list of electronic files in the external storage system 30, acquiring an electronic file based on the acquired list, compressing the acquired electronic file, and delivering the electronic file by mail.

As described above, the service providing system 10 according to the present embodiment provides various services in cooperation with the external storage system 30.

<Functional Configuration>

Figure 4:
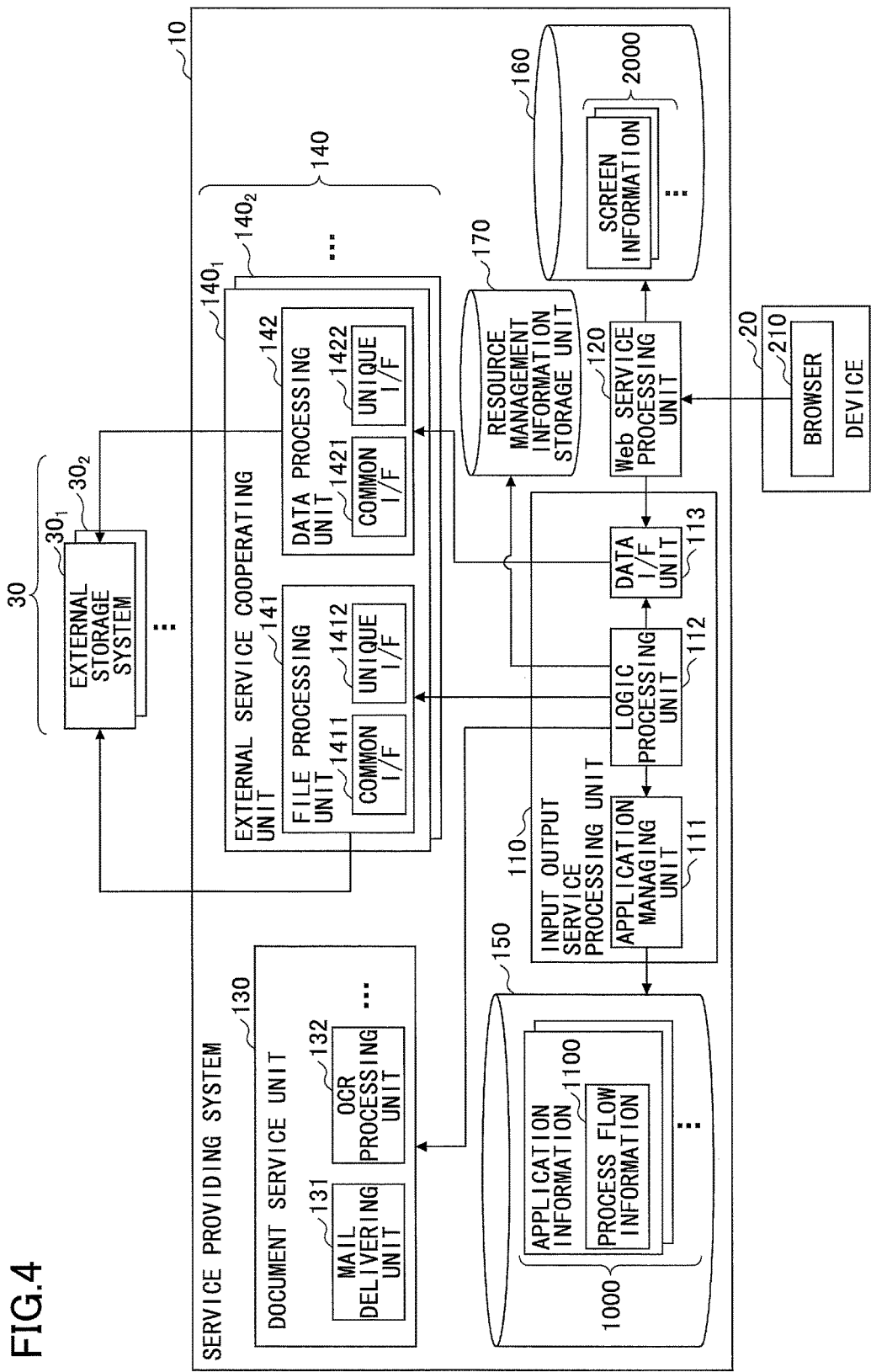
FIG. 4 illustrates a functional configuration of an example of the information processing system according to the first embodiment of the present invention.

Next, a description is given of a functional configuration of the information processing system 1 according to the present embodiment, by referring to FIG. 4. FIG. 4 illustrates a functional configuration of an example of the information processing system 1 according to the present embodiment.

The device 20 illustrated in FIG. 4 includes a browser 210 executed by, for example, the CPU 31, etc. The user of the device 20 is able to use a service provided by the service providing system 10, via the browser 210. In this way, the device 20 according to the present embodiment can function by having the browser 210 installed.

The service providing system 10 illustrated in FIG. 4 includes an input output service processing unit 110, a web service processing unit 120, a document service unit 130, and an external service cooperating unit 140. These units are implemented by a process that the CPU 16 is caused to execute by one or more programs installed in the service providing system 10.

Furthermore, the service providing system 10 illustrated in FIG. 4 includes an application information storage unit 150, a screen information storage unit 160, and a resource management information storage unit 170. These storage units can be realized by the HDD 18. Note that at least one storage unit among the application information storage unit 150, the screen information storage unit 160, and the resource management information storage unit 170 may be realized by a storage device, etc., that is coupled to the service providing system 10 via a network N1.

The input output service processing unit 110 performs a process relevant to a service provided by the service providing system 10. Here, the input output service processing unit 110 includes an application managing unit 111, a logic processing unit 112, and a data I/F unit 113.

The application managing unit 111 manages application information 1000 stored in the application information storage unit 150. Note that the application information 1000 is an application for providing various services. That is, the various services provided by the service providing system 10 are provided according to the application information 1000.

Furthermore, the application managing unit 111 returns process flow information 1100 included in the application information 1000, in response to a request from the logic processing unit 112. Note that the process flow information 1100 is information defining a sequence of processes (hereinafter, a sequence of processes is also referred to as a "process flow") for implementing a service provided by the application information 1000.

The logic processing unit 112 acquires the process flow information 1100 from the application managing unit 111, in response to a request from the web service processing unit 120. Then, the logic processing unit 112 executes a process flow for implementing a service, based on the acquired process flow information 1100. Accordingly, in the information processing system 1 according to the present embodiment, various services are provided by the service providing system 10. Note that details of the logic processing unit 112 are described below.

The data I/F unit 113 makes various requests to a data processing unit 142 of the external service cooperating unit 140, in response to a request from the web service processing unit 120 and the logic processing unit 112. For example, the data I/F unit 113 makes a request to acquire a file list indicating a list of storage destinations of electronic files (that is, a storage destination list of electronic files), to the data processing unit 142 of the external service cooperating unit 140.

The web service processing unit 120 returns screen information 2000 stored in the screen information storage unit 160, in response to a request from the browser 210. Note that the screen information 2000 is information defining a screen to be displayed on the browser 210, and is defined in a format of, for example, HyperText Markup Language (HTML) and Cascading Style Sheets (CSS).

Accordingly, on the operation panel 22 of the device 20, a service list screen for selecting a service provided by the service providing system 10, and a service screen for using a service, etc., are displayed by the browser 210.

Furthermore, the web service processing unit 120 makes various requests to the input output service processing unit 110, in response to a request from the browser 210. For example, the web service processing unit 120 makes a request to execute a process flow for implementing the "OCR delivery 1" service to the logic processing unit 112 of the input output service processing unit 110, in response to a request from the browser 210.

The document service unit 130 executes processes included in a sequence of processes (process flow) based on the process flow information 1100. The document service unit 130 includes a mail delivering unit 131 and an OCR processing unit 132.

The mail delivering unit 131 creates a mail to which an electronic file is attached, and delivers the mail to a specified mail address. The OCR processing unit 132 performs an OCR process on the electronic file.

Note that the document service unit 130 may also include, for example, a data converting unit for converting data format of the electronic file into a predetermined data format, and a compression/decompression processing unit for compressing or decompressing the electronic file.

As described above, the document service unit 130 includes various functional units for executing processes included in a sequence of processes (process flow). Therefore, the document service unit 130 is realized by a group of programs (modules) for providing the various functions.

The external service cooperating unit 140 makes various requests to the external storage system 30, in response to a request from the logic processing unit 112 and the data I/F unit 113.

The service providing system 10 according to the present embodiment includes the external service cooperating unit 140 corresponding to each external storage system 30. That is, the service providing system 10 includes the external service cooperating unit $140_1$ for making various requests to the external storage system $30_1$, and the external service cooperating unit $140_2$ for making various requests to the external storage system $30_2$, etc.

As described above, the service providing system 10 according to the present embodiment includes the external service cooperating unit 140 corresponding to each external storage system 30 for performing a process in cooperation with the service providing system 10. Note that in the following, when each of the plurality of external service cooperating units 140 is distinguished, a suffix is added such as the "external service cooperating unit 140₁" and the "external service cooperating unit 140₂".

Here, the external service cooperating unit 140 includes a file processing unit 141 for receiving a request from the logic processing unit 112 and the data processing unit 142 for receiving a request from the data I/F unit 113.

The file processing unit 141 includes a common I/F 1411 and a unique I/F 1412, in which an application programming interface (API) for conducting a file operation (e.g., an acquisition operation, a storage operation, and an edit operation) to the electronic file stored in the external storage system 30, is defined.

The common I/F 1411 is an API commonly used among the plurality of external storage systems 30 as, for example, the API illustrated in FIG. 5A. That is, the common I/F 1411 of the file processing unit 141 is a group of APIs for using a function (e.g., a file acquisition function, and a file storage function) related to the file operation which can be used by all of the external storage systems 30.

The unique I/F 1412 is an API used by a specific external storage system 30 as, for example, the API illustrated in FIG. 5B. That is, the unique I/F 1412 of the file processing unit 141 is an API group of APIs for using a function (e.g., an editing function of an electronic file) related to the file operation that can be used in the specific external storage system 30.

Therefore, the common I/F 1411 is similarly defined for all the external service cooperating units 140. On the other hand, the unique I/F 1412 is defined for the external service cooperating unit 140 corresponding to the specific external storage system 30, in which the API defined by the unique I/F 1412 can be used.

On the other hand, the data processing unit 142 includes a common I/F 1421 and a unique I/F 1422, in which an API for acquiring meta data (e.g., a file list and a folder list) of bibliographic information of the electronic file stored in the external storage system 30 is defined.

The common I/F 1421 is an API commonly used among the plurality of external storage systems 30 as, for example, the API illustrated in FIG. 5C. That is, the common I/F 1421 of the data processing unit 142 is an API group of APIs for using a function (e.g., a function of acquiring a list of files and a list of folders) related to meta data acquisition that can be used by all the external storage systems 30.

The unique I/F 1422 is an API, which can be used by the specific external storage system 30, such as the API illustrated in FIG. 5D. That is, the unique I/F 1422 of the data processing unit 142 is an API group of APIs for using a function (e.g., a function of acquiring a list of image files), which is related to acquisition of metadata that can be used by the specific external storage system 30.

Therefore, the common I/F 1421 is similarly defined for all the external service cooperating units 140. On the other hand, the unique I/F 1422 is defined for the external service cooperating unit 140 corresponding to the specific external storage system 30, in which the API defined by the unique I/F 1422 can be used.

As described above, the service providing system 10 according to the present embodiment includes the external service cooperating units 140 respectively corresponding to the external storage systems 30, which respectively perform processes in cooperation with the service providing system 10. Therefore, in a case where the external storage system 30 to be the cooperation destination of the service providing system 10 is added or deleted (hereinafter, referred to as an "addition, etc."), the external service cooperating unit 140 corresponding to the external storage system 30 is to be added, etc., to the service providing system 10.

Therefore, in the service providing system 10 according to the first embodiment, the influence caused by the addition, etc., of the external storage system 30, which is to be the cooperation destination, can be localized. That is, in the service providing system 10 according to the present embodiment, the addition, etc., of the external storage system 30, which is to be the cooperation destination, can be done without influencing the other functional units (i.e., the input output service processing unit 110 and the web service processing unit 120, etc.).

Therefore, in the service providing system 10 according to the present embodiment, it is possible to reduce the development labor hours in the case of performing the addition, etc., of the external storage system 30 that is the cooperation destination of the service providing system 10. Note that the addition, etc., of the external service cooperating unit 140 may be performed by using a Software Development Kit (SDK).

Furthermore, the external service cooperating unit 140 realizes the common I/F 1411 and the unique I/F 1412 by different modules, etc. Furthermore, the API defined by the common I/F 1411 and the unique I/F 1412 may be used by specifying an external service name (storage service name).

Therefore, in the service providing system 10 according to the present embodiment, when adding the external storage system 30 to be the cooperation destination of the service providing system 10, the common I/F 1411 included in another external service cooperating unit 140 can be reused. That is, when adding the external storage system 30 to be the cooperation destination, only the unique I/F 1412 needs to be developed. Accordingly, in the service providing system 10 according to the present embodiment, the development labor hours when adding the external storage system 30 to be the cooperation destination can be further reduced. Note that the same applies with respect to the common I/F 1421 and the unique I/F 1422.

The application information storage unit 150 stores the application information 1000. The application information 1000 is stored in the application information storage unit 150, in association with an application ID for uniquely identifying the application information 1000 (application).

Here, the application information 1000 includes the process flow information 1100. For example, the application information 1000 for providing the "OCR delivery 1" service includes the process flow information 1100 in which a sequence of processes (process flow) for implementing this service is defined. Note that the application information 1000 may include two or more process flow information items 1100.

As described above, the process flow information 1100 is information defining a sequence of processes (process flow) for implementing a service provided by the application information 1000. Note that details of the process flow information 1100 are described below.

The screen information storage unit 160 stores the screen information 2000. As described above, the screen information 2000 is information defining a screen to be displayed on the browser 210. Note that the screen information 2000 of a service screen for using a service provided by the application information 1000, is stored in the screen information storage unit 160, in association with an application ID of the application information 1000.

The resource management information storage unit 170 stores resource management information 170D for managing the processing results, etc., of the processes included in the sequence of processes (process flow) based on the process flow information 1100. Note that details of the resource management information 170D are described below.

Figure 6:
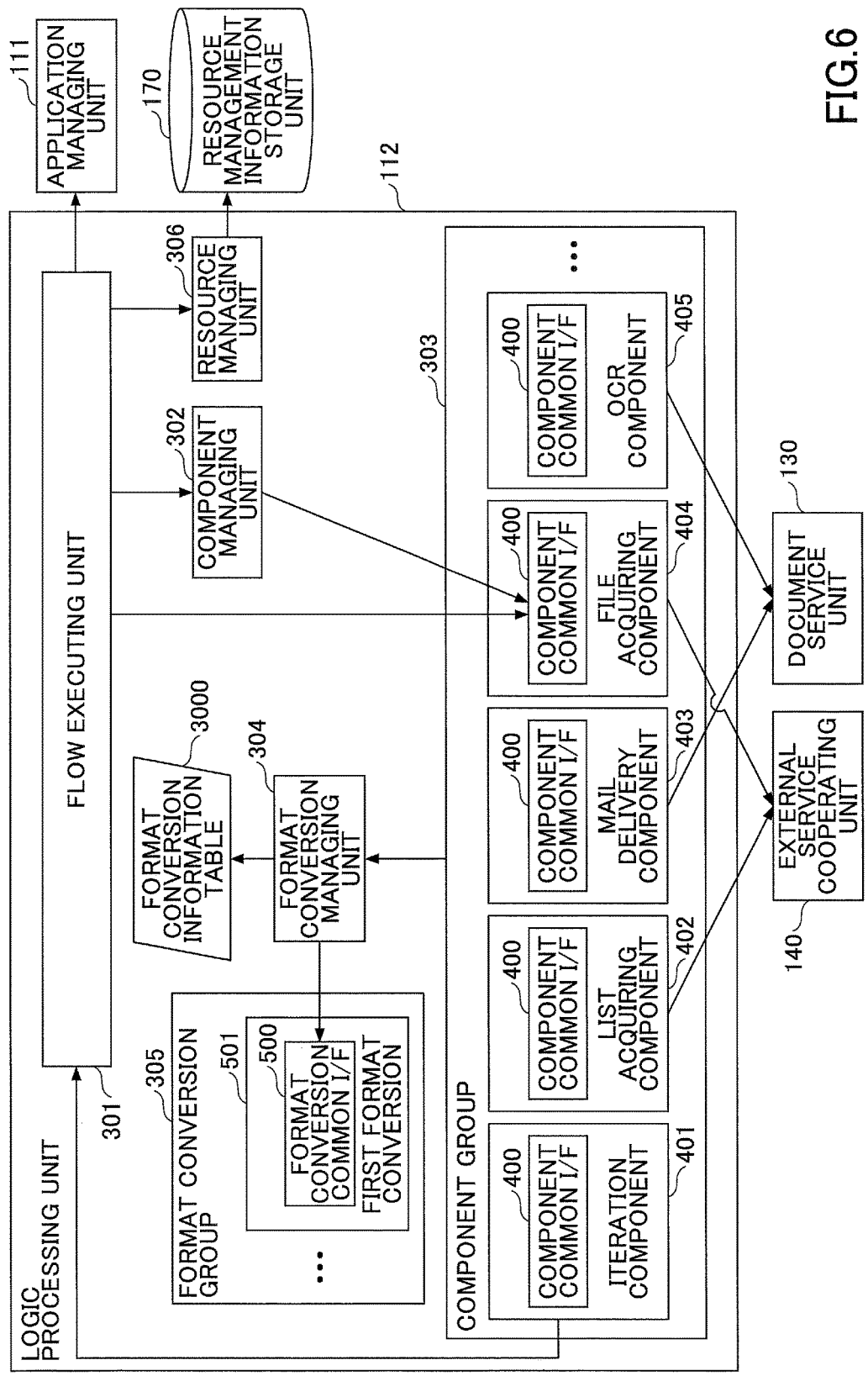
FIG. 6 illustrates an example of a functional configuration of a logic processing unit according to the first embodiment of the present invention.

Here, a description is given of details of the functional configuration of the logic processing unit 112, by referring to FIG. 6. FIG. 6 illustrates an example of a functional configuration of the logic processing unit 112 according to the present embodiment.

The logic processing unit 112 illustrated in FIG. 6 includes a flow executing unit 301, a component managing unit 302, a component group 303, a format conversion managing unit 304, a format conversion group 305, and a resource managing unit 306. Furthermore, the logic processing unit 112 includes a format conversion information table 3000.

When the flow executing unit 301 receives a process execution request from the browser 210 via the web service processing unit 120, the flow executing unit 301 acquires, from the application managing unit 111, the process flow information 1100 included in the application information 1000. Then, the flow executing unit 301 executes a sequence of processes (process flow) based on the acquired process flow information 1100.

Here, a sequence of processes based on the process flow information 1100 is executed by combining components for executing the processes included in the sequence of processes. Note that a component is implemented by programs and modules, etc., for providing predetermined functions, and is defined by, for example, a class and a function, etc.

The component managing unit 302 manages components. The component managing unit 302 generates a component and returns the generated component to the flow executing unit 301, in response to a request from the flow executing unit 301. Note that generating a component means loading a component defined by, for example, a class and a function, etc., in a memory (for example, the RAM 14).

The component group 303 is an assembly of components. The component group 303 includes an iteration component 401, a list acquiring component 402, a mail delivery component 403, a file acquiring component 404, and an OCR component 405.

The iteration component 401 is a component for implementing the iteration of one or more processes. That is, the iteration component 401 implements the iteration of one or more processes by repeatedly executing another process flow including the one or more processes.

The list acquiring component 402 is a component for acquiring the storage destination list of electronic files from the specified external storage system 30. The mail delivery component 403 is a component for delivering a mail to a specified mail address.

The file acquiring component 404 is a component for acquiring (downloading) an electronic file from the external storage system 30. The OCR component 405 is a component for performing an OCR process on an electronic file.

Note that the component group 303 also includes various components such as a compression component for compressing an electronic file and a component for converting the data format of an electronic file, etc., other than the above components.

Furthermore, each component included in the component group 303 includes a component common I/F 400. The component common I/F 400 is an API that is commonly defined for the components, and includes an API for generating a component and an API for requesting to execute a process of the component.

As described above, the components include the component common I/F 400, and therefore the influence caused by the addition, etc., of a component can be localized. That is, for example, the addition, etc., of a component can be performed without influencing the flow executing unit 301 or the component managing unit 302, etc. Accordingly, in the service providing system 10 according to the present embodiment, the development labor hours associated with the addition, etc., of a predetermined function, etc., (that is, the addition, etc., of a component for executing processes for implementing the function) can be reduced.

Note that, for example, the component managing unit 302 may generate each component included in the component group 303 by the component common I/F 400, when the service providing system 10 is activated.

The format conversion managing unit 304 manages the format conversion of the data format. Here, the data format that each component can handle is defined in advance. Therefore, in response to a request from a component, the format conversion managing unit 304 refers to the format conversion information table 3000, for example, as illustrated in FIG. 7, and generates a format conversion to be included in the format conversion group 305.

Then, the format conversion managing unit 304 requests the generated format conversion to execute a format conversion process. Note that format conversion is a program and a module, etc. for executing a format conversion process of converting the data format, and is defined by, for example, a class and a function, etc. Furthermore, the generation of format conversion means, for example, to load the format conversion defined by a class, in a memory (for example, the RAM 14).

Note that examples of data formats are a data format "InputStream" indicating stream data, "LocalFilePath" indicating the path (address) of the electronic file stored in a storage device, etc., and "File" indicating the entity of an electronic file, etc.

Here, a description is given of the format conversion information table 3000, by referring to FIG. 7. FIG. 7 illustrates an example of the format conversion information table 3000.

The format conversion information table 3000 illustrated in FIG. 7 includes the data items of a data format before conversion, a data format after conversion, and a conversion format conversion to be generated. That is, the format conversion information stored in the format conversion information table 3000 is information in which a format conversion, which is for converting a data format before conversion into a data format after conversion, is associated with each data format before conversion and each data format after conversion.

The format conversion group 305 is an assembly of format conversions. The format conversion group 305 includes the first format conversion 501 for converting the data format "InputStream" into "LocalFilePath". Note that the format conversion group 305 also includes a second format conversion for converting the data format "LocalFilePath" into "File", etc.

Furthermore, each format conversion included in the format conversion group 305 includes a format conversion common I/F 500. The format conversion common I/F 500 is an API that is commonly defined for the format conversions. The format conversion common I/F 500 includes an API for generating a format conversion and an API for executing a format conversion process of the format conversion.

As described above, each format conversion includes the format conversion common I/F 500, and therefore the influence caused by the addition, etc., of a format conversion can be localized. That is, for example, the addition, etc., of a format conversion can be performed without influencing the format conversion managing unit 304, etc. Accordingly, in the service providing system 10 according to the present embodiment, the development labor hours associated with the addition, etc., of a format conversion can be reduced.

The resource managing unit 306 manages the resource management information 170D stored in the resource management information storage unit 170. That is, the resource managing unit 306 stores the processing result of a component in the resource management information storage unit 170 as the resource management information 170D, in response to a request from each component.

Figure 8:
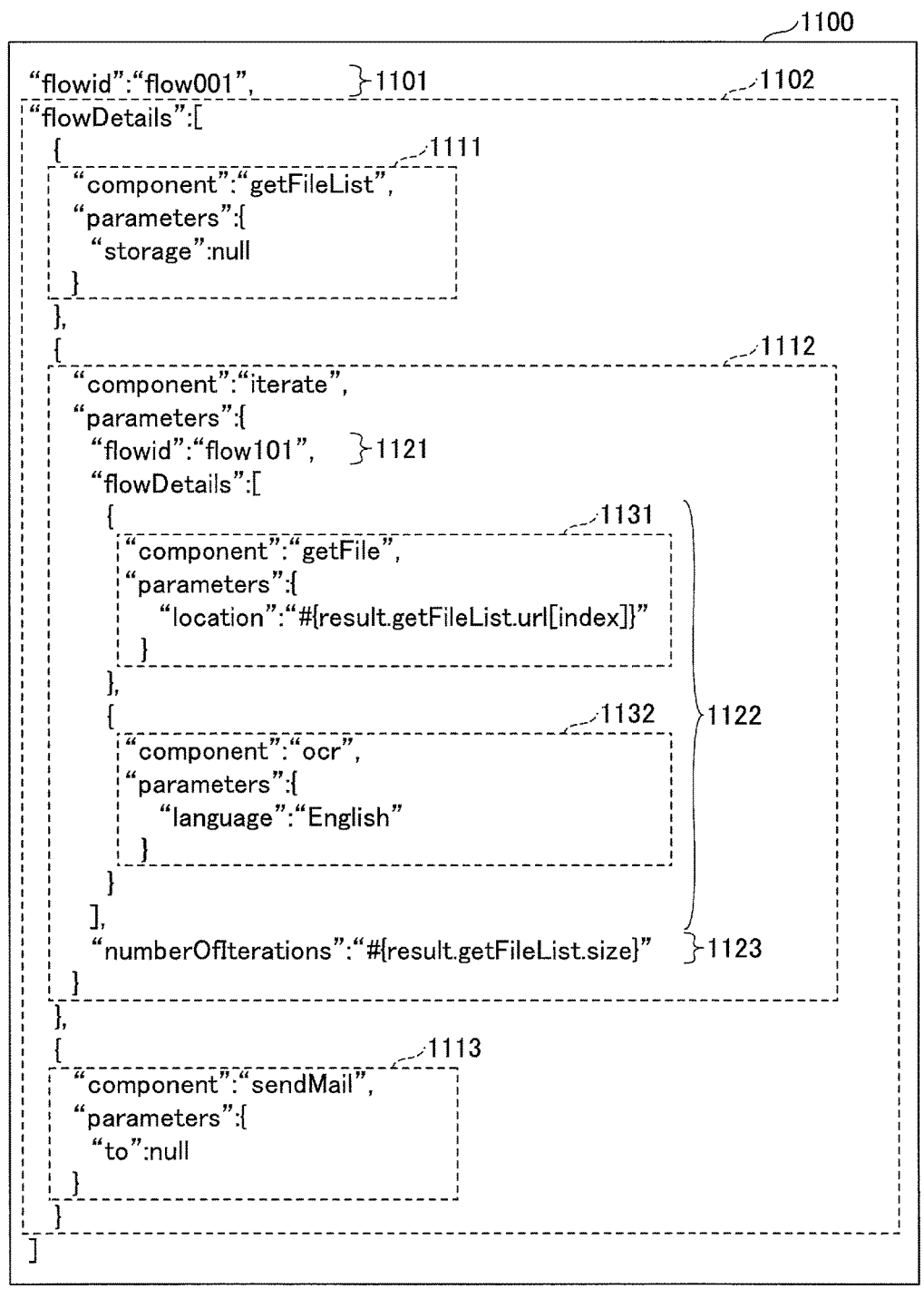
FIG. 8 illustrates an example of process flow information in which a process flow for implementing a "OCR delivery 1" service is defined, according to the first embodiment of the present invention.

Here, a description is given of the process flow information 1100 included in the application information 1000 for providing the "OCR delivery 1" service, by referring to FIG. 8. FIG. 8 illustrates an example of the process flow information 1100 in which a process flow for implementing the "OCR delivery 1" service is defined.

The process flow information 1100 illustrated in FIG. 8 is information in which a sequence of processes (process flow) for implementing the "OCR delivery 1" service is defined.

The process flow information 1100 illustrated in FIG. 8 includes a flow ID 1101 indicating identification information uniquely identifying the process flow information 1100, and a flow detail 1102 defining the process content of each process included in the process flow.

The flow detail 1102 includes process definitions 1111 through 1113 respectively defining the process content of the processes included in the process flow. Each of the process definitions 1111 through 1113 includes "component" indicating a component for executing the process and "parameters" indicating parameters with respect to the component.

Specifically, "component" of the process definition 1111 defines "getFileList" indicating to execute a process by the list acquiring component 402. Furthermore, "parameters" defines a parameter "storage" with respect to the list acquiring component 402. Note that the parameter "storage" is a parameter defining identification information of the external storage system 30 from which the storage destination list of electronic files is to be acquired.

Similarly, "component" of the process definition 1113 defines "sendMail" indicating to execute a process by the mail delivery component 403. Furthermore, "parameters" defines a parameter "to" with respect to the mail delivery component 403. Note that the parameter "to" is a parameter defining a mail address to be the delivery destination of the mail.

Similarly, "component" of the process definition 1112 defines "iterate" indicating to execute a process by the mail delivery component 403. Furthermore, "parameters" define parameters 1121 through 1123 with respect to the iteration component 401.

Here, the parameter 1121 is a parameter defining the flow ID of another process flow that is repeatedly executed by the iteration component 401. Furthermore, the parameter 1122 is a parameter defining the flow details including process definitions 1131 and 1132 respectively defining the processes included in the other process flow. Furthermore, the parameter 1123 is a parameter defining the number of times of repeatedly executing the other process flow (iteration frequency).

As described above, the process definition 1112 defining a process by the iteration component 401 includes the flow details of another process flow to be repeatedly executed, and the frequency of repeatedly executing the other process flow. Accordingly, as described below, the other process flow can be repeatedly executed and the iteration of one or more processes can be implemented by the iteration component 401.

Note that the processes defined in the process flow information 1100 illustrated in FIG. 8 are executed in an order starting from the top process. That is, the processes in a sequence of processes (process flow) based on the process flow information 1100 in FIG. 8 are executed in the order of the process defined in the process definition 1111, the process defined in the process definition 1112, and the process defined in the process definition 1113. However, the order of executing the processes is not so limited; for example, the process flow information 1100 may include information defining the order of executing the processes.

Figure 9:
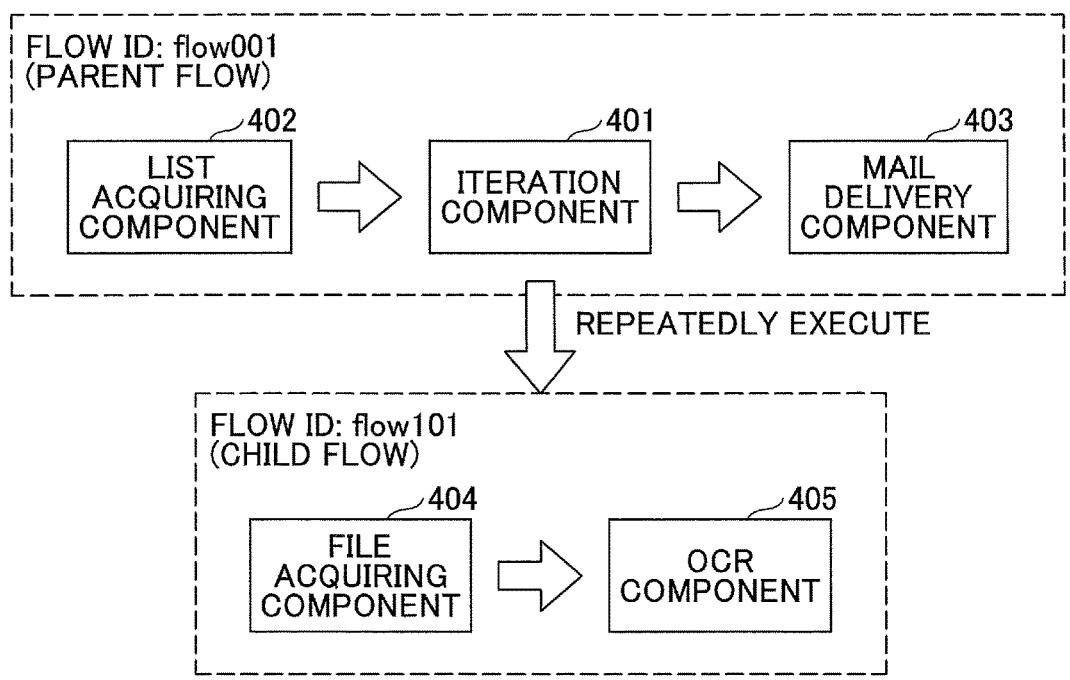
FIG. 9 is a diagram for describing an example of a process flow for implementing the "OCR delivery 1" service according to the first embodiment of the present invention.

Here, a process flow based on the process flow information 1100 illustrated in FIG. 8 (that is, a process flow for implementing the "OCR delivery 1" service) is illustrated in FIG. 9. FIG. 9 is a diagram for describing an example of a process flow for implementing the "OCR delivery 1" service. Note that in the following, a process flow based on the process flow information 1100 is also referred to as a "parent flow", and another process flow to be repeatedly executed by the iteration component 401 is also referred to as a "child flow".

As illustrated in FIG. 9, in the process flow for implementing the "OCR delivery 1" service, first, the list acquiring component 402 acquires the storage destination list of electronic files stored in the external storage system 30.

Next, the iteration component 401 causes the repeated execution of a process by the file acquiring component 404 and a process by the OCR component 405, for each storage destination included in the storage destination list. Accordingly, an electronic file is acquired (downloaded) and an OCR process is performed on the electronic file, for each storage destination included in the storage destination list.

Lastly, the mail delivery component 403 delivers the electronic file that as undergone the OCR process, by mail.

As described above, in the "OCR delivery 1" service, the iteration component 401 of the parent flow causes the repeated execution of a child flow (another process flow), to implement the iteration of one or more processes. Note that when the iteration component 401 is included in the child flow, yet another process flow (grandchild flow) is to be repeatedly executed.

<Process Details>

Next, a description is given of details of processes by the information processing system 1 according to the present embodiment.

In the following, a description is given of a process performed when a user U of the device 20 uses the browser 210 to use the "OCR delivery 1" service provided by the service providing system 10, by referring to FIG. 10. FIG. 10 is a sequence diagram of an example of the overall process performed when using the "OCR delivery 1" service according to the present embodiment.

The user U uses the browser 210 of the device 20 to perform a display operation of displaying a list of services provided by the application information 1000 (step S1001).

When the browser 210 of the device 20 accepts a display operation for displaying a list of services, the browser 210 sends a request to acquire a service list screen to the web service processing unit 120 of the service providing system 10 (step S1002).

When the web service processing unit 120 receives the request to acquire a service list screen, the web service processing unit 120 acquires the screen information 2000 of the service list screen from the screen information storage unit 160 (step S1003). Then, the web service processing unit 120 returns the screen information 2000 of a service list screen to the browser 210.

Note that the screen information 2000 of a service list screen includes an application ID of the application information 1000 for providing a service, and a flow ID of the process flow information 1100 included in the application information 1000, for each service.

Figure 11A:
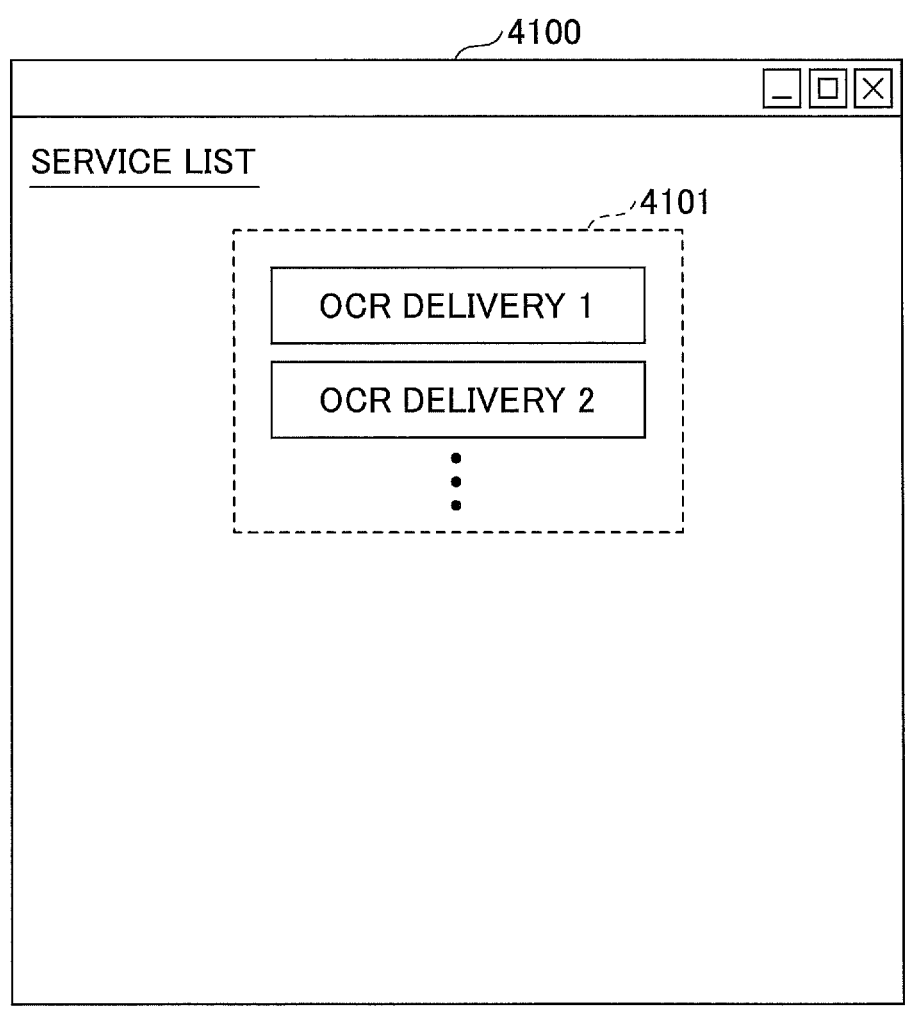
FIGS. 11A and 11B illustrate an example of a screen transition from a service list screen to a service screen of the "OCR delivery 1" service, according to the first embodiment of the present invention.

When the browser 210 of the device 20 receives the screen information 2000 of a service list screen, the browser 210 causes the operation panel 22 to display a service list screen 4100, for example, illustrated in FIG. 11A, based on the screen information 2000 (step S1004).

The service list screen 4100 illustrated in FIG. 11A includes a service name list 4101 that is a list of service names provided by the service providing system 10.

Next, the user U selects "OCR delivery 1" from the service name list 4101 in the service list screen 4100, and performs an operation of selecting the service (step S1005).

When the browser 210 of the device 20 accepts the operation of selecting the service, the browser 210 sends a request to acquire a service screen to the web service processing unit 120 (step S1006). Note that the acquisition request includes an application ID of the application information 1000 for providing the "OCR delivery 1" service selected by the user U.

When the web service processing unit 120 receives the request to acquire a service screen, the web service processing unit 120 acquires the screen information 2000 (screen information 2000 of service screen) stored in the screen information storage unit 160 in association with the application ID included in the acquisition request (step S1007). Then, the web service processing unit 120 returns the acquired screen information 2000 to the browser 210.

Figure 11B:
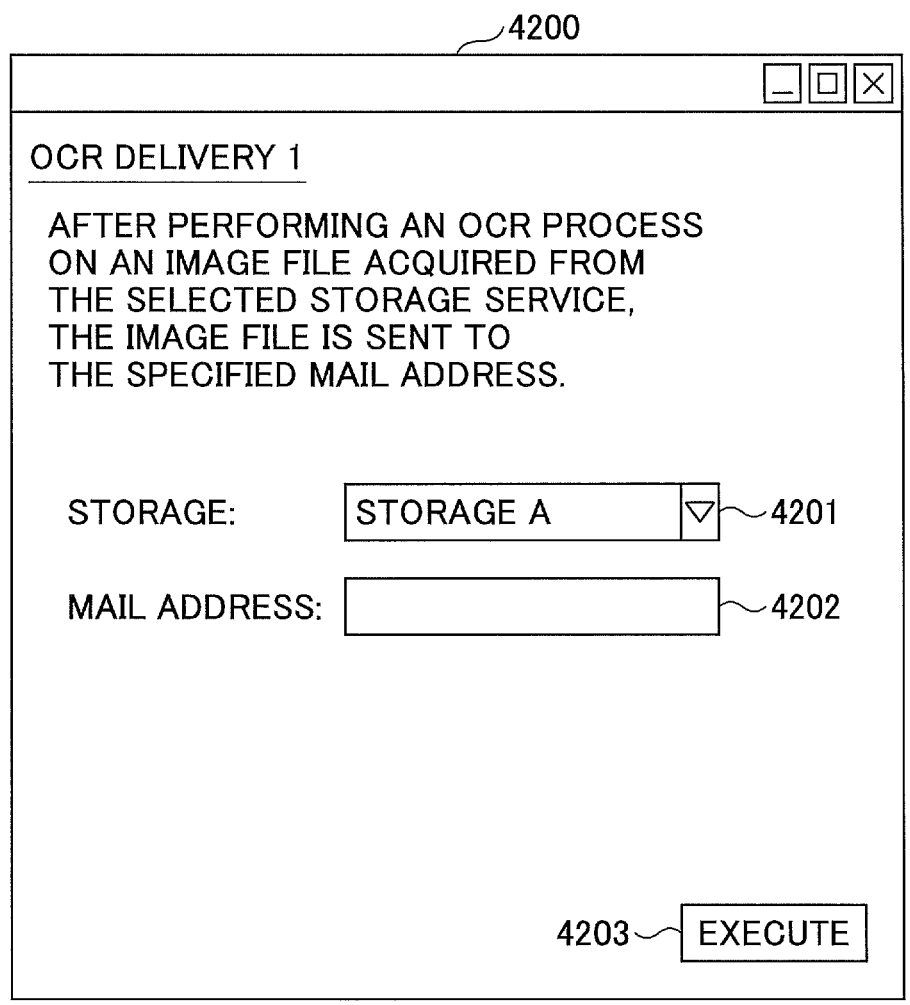

When the browser 210 of the device 20 receives the screen information 2000 of the service screen, the browser 210 causes the operation panel 22 to display a service screen 4200, for example, illustrated in FIG. 11B, based on the screen information 2000 (step S1008).

The service screen 4200 illustrated in FIG. 11B is a screen for using the "OCR delivery 1" service selected by the user U. The service screen 4200 illustrated in FIG. 11B includes a storage specification field 4201, a mail address specification field 4202, and an execution button 4203. (FIGS. 11A and 11B illustrate an example of a screen transition from the service list screen 4100 to the service screen 4200 of the "OCR delivery 1" service.)

Here, the storage specification field 4201 is a field for specifying a storage service name of the external storage system 30 from which the storage destination list of electronic files is to be acquired. The mail address specification field 4202 is a field for specifying the destination (mail address) to which the electronic file that has undergone the OCR process is to be delivered by mail. Note that the service screen 4200 may include, for example, a CC specification field and a BCC specification field, etc., for specifying a destination to which the electronic file, which has undergone an OCR process, is to be delivered by mail by way of CC or BCC.

Next, in the service screen 4200, the user U specifies a desired service name in the storage specification field 4201, specifies a desired mail address in the mail address specification field 4202, and presses the execution button 4203 (step S1009).

Here, in the following description, it is assumed that the user U has specified "storage A" in the storage specification field 4201, has specified a mail address "hoge@fuga.com" in the mail address specification field 4202, and has pressed the execution button 4203.

When the browser 210 of the device 20 accepts the operation of pressing the execution button 4203, the browser 210 sends a request to execute a process flow for implementing the "OCR delivery 1" service to the web service processing unit 120 (step S1010).

Note that the execution request includes an application ID of the application information 1000 for providing the "OCR delivery 1" service and a flow ID of the process flow information 1100 for implementing the service. Furthermore, the execution request includes input information (that is, the storage service name and the mail address) that has been input in the service screen 4200 by the user U.

When the web service processing unit 120 receives the request to execute a process flow, the web service processing unit 120 sends the execution request to the logic processing unit 112 of the input output service processing unit 110 (step S1011).

When the logic processing unit 112 of the input output service processing unit 110 receives the request to execute the process flow, the logic processing unit 112 executes a sequence of processes (that is, a parent flow) based on the process flow information 1100 corresponding to the application ID and the flow ID included in the execution request (step S1012).

Then, the logic processing unit 112 returns the processing result of the sequence of processes to the browser 210 of the device 20 via the web service processing unit 120.

Accordingly, in the service providing system 10 according to the present embodiment, the sequence of processes for implementing the "OCR delivery 1" service is executed, and the service is provided to the device 20.

Figure 12:
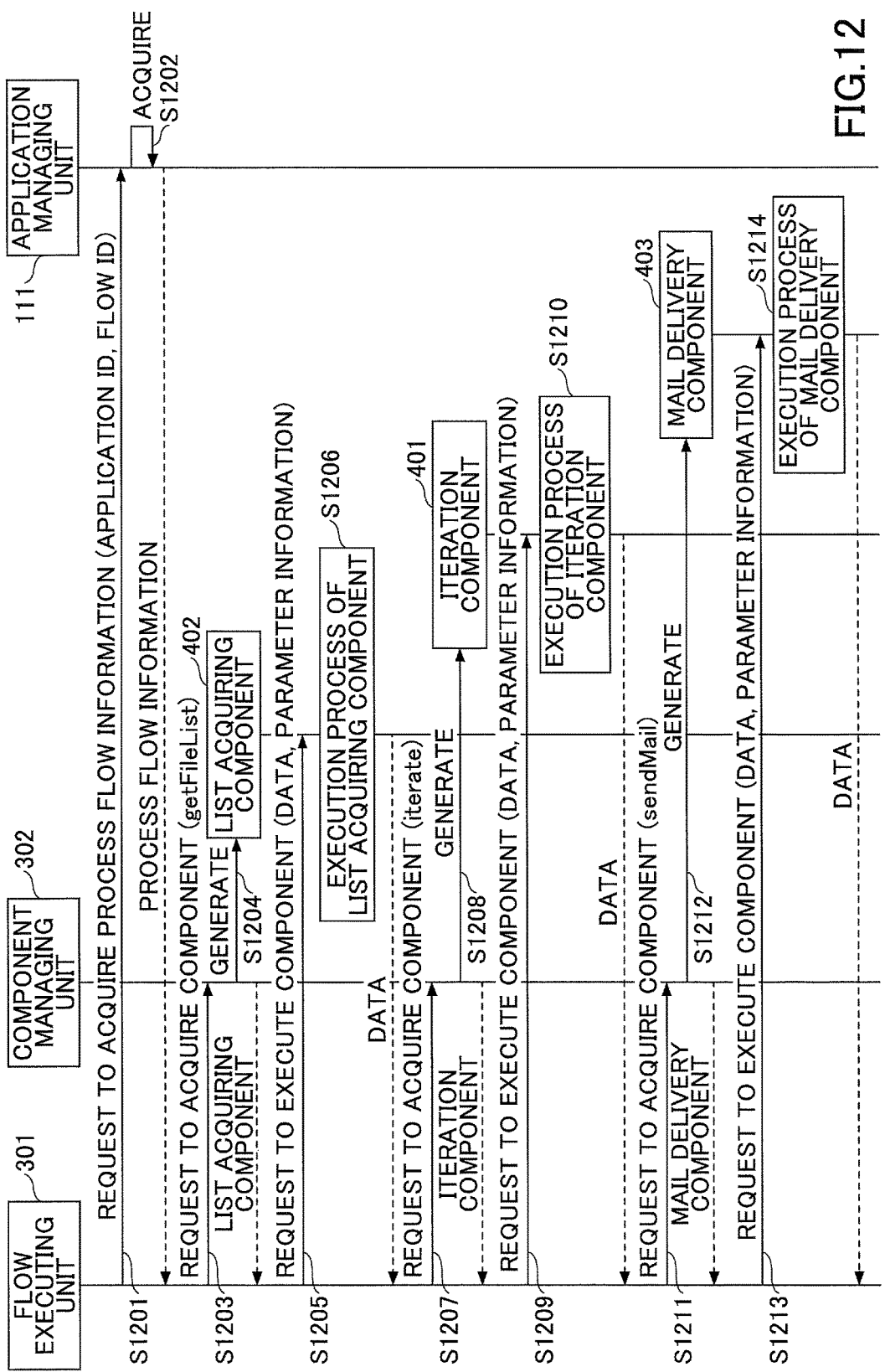
FIG. 12 is a sequence diagram of an example of a process of executing a parent flow according to the first embodiment of the present invention.

Here, a detailed description is given of the process of executing the process flow of step S1012 described above (the process of executing the parent flow), by referring to FIG. 12. FIG. 12 is a sequence diagram of an example of a process of executing the parent flow according to the present embodiment.

When the flow executing unit 301 receives a request to execute the process flow, the flow executing unit 301 sends a request to acquire process flow information to the application managing unit 111 (step S1201). Note that the acquisition request includes the application ID and the flow ID included in the request to execute the process flow received from the web service processing unit 120.

When the application managing unit 111 receives the request to acquire the process flow information, the application managing unit 111 acquires the process flow information 1100 corresponding to the application ID and the flow ID included in the acquisition request, from the application information storage unit 150 (step S1202). Then, the application managing unit 111 returns the acquired process flow information 1100 to the flow executing unit 301. Accordingly, the process flow information 1100 illustrated in FIG. 8 is returned to the flow executing unit 301.

When the flow executing unit 301 receives the process flow information 1100 from the application managing unit 111, the flow executing unit 301 sends a request to acquire a component based on the process flow information 1100, to the component managing unit 302 (step S1203).

That is, the flow executing unit 301 sends, to the component managing unit 302, a request to acquire the list acquiring component 402 corresponding to "getFileList" defined in "component" included in the process definition 1111 in the process flow information 1100 of FIG. 8.

When the component managing unit 302 receives the request to acquire a component, the component managing unit 302 generates the list acquiring component 402 (step S1204). Note that the list acquiring component 402 can be generated by using the API for generating components defined in the component common I/F 400.

Then, the component managing unit 302 returns the generated list acquiring component 402 to the flow executing unit 301. That is, the component managing unit 302 returns an address in a memory (for example, the RAM 14) in which the list acquiring component 402 is loaded, to the flow executing unit 301.

Next, the flow executing unit 301 sends a component execution request to the list acquiring component 402 (step S1205). Note that the execution request includes data and parameter information.

Here, the data is input information received from the browser 210, as a data format "InputStream" (that is, a storage service name "storage A"). That is, the flow executing unit 301 transfers the storage service name, which is included in the input information transferred as the data format "InputStream" from the browser 210, to the list acquiring component 402 simply as "data" (without considering the data format), and requests the execution of the process. In the present embodiment, various kinds of information, for which the data format is not considered as described above (for example, input information and an electronic file, etc.), are simply referred to as "data".

Furthermore, the parameter information is "storage":null defined in "parameters" included in the process definition 1111 in the process flow information 1100 of FIG. 8.

When the list acquiring component 402 receives the component execution request, the list acquiring component 402 performs an execution process of the component (step S1206). Then, the list acquiring component 402 returns data indicating the processing result of the executed process, to the flow executing unit 301.

Note that the data returned here includes, for example, information indicating that the execution process of the list acquiring component 402 has normally ended.

Figure 13:
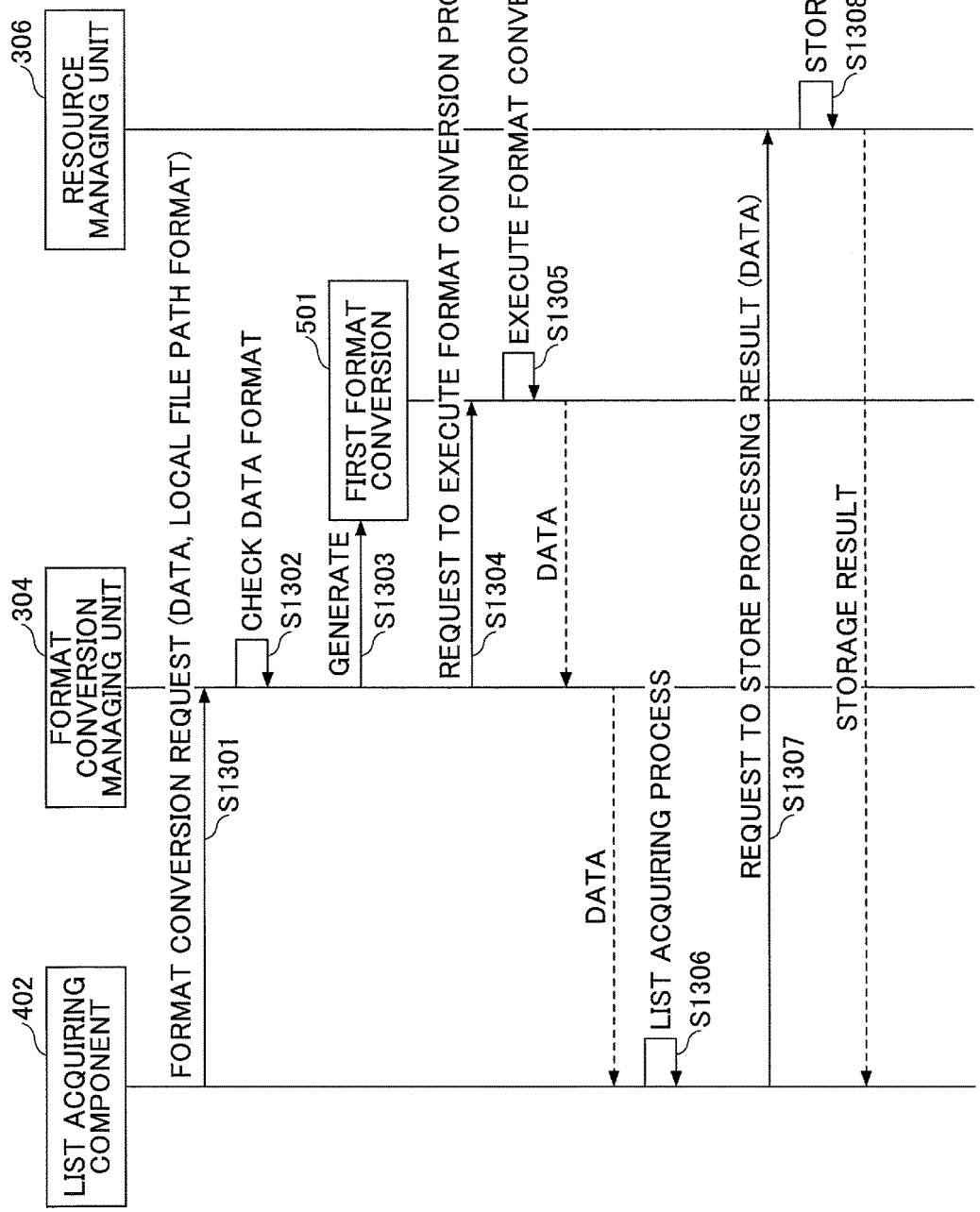
FIG. 13 is a sequence diagram of an example of the execution process of a list acquiring component according to the first embodiment of the present invention.

Here, a description is given of the execution process of the list acquiring component 402, by referring to FIG. 13. FIG. 13 is a sequence diagram of an example of the execution process of the list acquiring component 402 according to the present embodiment.

First, the list acquiring component 402 sends a format conversion request to the format conversion managing unit 304 (step S1301). Note that the format conversion request includes data and a specification of "LocalFilePath" indicating the data format that can be handled by the list acquiring component 402.

When the format conversion managing unit 304 receives the format conversion request, the format conversion managing unit 304 checks whether the data format of the data included in the format conversion request and the specified data format match each other (step S1302).

Here, the data format of the data included in the received format conversion request is "InputStream", while the specified data format is "LocalFilePath". Therefore, the format conversion managing unit 304 determines that the data format of the data included in the format conversion request and the specified data format do not match each other.

Then, the format conversion managing unit 304 refers to the format conversion information table 3000, identifies the first format conversion 501 for converting "InputStream" into "LocalFilePath", and generates the identified first format conversion 501 (step S1303). Note that the first format conversion 501 may be generated by using the API defined in the format conversion common I/F 500.

Next, the format conversion managing unit 304 sends a format conversion request to the generated first format conversion 501 (step S1304). Note that the format conversion request includes data.

When the first format conversion 501 receives the format conversion request, the first format conversion 501 converts the data format of the data included in the request, from "InputStream" to "LocalFilePath" (step s1305). Then, the first format conversion 501 returns the data after conversion to the list acquiring component 402 via the format conversion managing unit 304.

When the list acquiring component 402 receives the data after format conversion, the list acquiring component 402 uses the parameter information to execute a process (step S1306). That is, the list acquiring component 402 specifies "storage A" included in the data at the parameter "storage" included in the parameter information, and executes a list acquisition process.

More specifically, the list acquiring component 402 acquires a file list by using the API "/external service name/data/files" in FIG. 5C, with respect to the data processing unit 142 of the external service cooperating unit $140_1$ via the data I/F unit 113. Accordingly, the list acquiring component 402 acquires the storage destination list of electronic files in the storage A.

Next, when the list acquiring component 402 executes the process, the list acquiring component 402 sends a request to store the processing result to the resource managing unit 306 (step S1307). Note that the storage request includes data indicating the result of the process by the list acquiring component 402 (that is, the storage destination list of electronic files).

When the resource managing unit 306 receives the request to store the processing result, the resource managing unit 306 stores the processing result in the resource management information 170D stored in the resource management information storage unit 170, based on the data included in the storage request (step S1308). Then, the resource managing unit 306 returns the storage result to the list acquiring component 402.

Here, a description is given of the processing result by the list acquiring component 402 stored in the resource management information 170D, by referring to FIG. 14.

As illustrated in FIG. 14, in the resource management information 170D, a processing result 171 by the list acquiring component 402 is stored. That is, the processing result 171 includes "url[0]" through "url[N−1]" indicating the storage destination Uniform Resource Locator (URL) of electronic files, and "size" indicating the size of the storage destination list (that is, the number of storage destination URLs). Said differently, the processing result 171 includes arrangements "url[0]" through "url[N−1]" in which the storage destination URLs of the electronic files are respectively stored, and the number of arrangements "size".

Furthermore, in the arrangements "url[0]" through "url [N−1]", the storage destination URLs of the electronic files are stored in a descending order of the creation dates of the electronic files. Accordingly, the storage destination URL of the newest electronic file is stored in "url[0]", while the storage destination URL of the oldest electronic file is stored in "url[N−1]".

As described above, in the resource management information 170D, the processing result of the component for executing the processes included in the sequence of processes is stored.

Referring back to FIG. 12, when the flow executing unit 301 receives the data indicating the processing result of the execution process of the component, the flow executing unit 301 sends a request to acquire a component based on the process flow information 1100, to the component managing unit 302 (step S1207).

That is, the flow executing unit 301 sends a request to acquire the iteration component 401 corresponding to "iterate" defined in "component" included in the process definition 1112 in the process flow information 1100 of FIG. 8, to the component managing unit 302.

When the component managing unit 302 receives the request to acquire a component, the component managing unit 302 generates the iteration component 401 (step S1208). Note that the iteration component 401 may be generated by using the API for generating a component defined in the component common I/F 400.

Then, the component managing unit 302 returns the generated iteration component 401 to the flow executing unit 301. That is, for example, the component managing unit 302 returns an address in a memory (for example, the RAM 14) in which the iteration component 401 is loaded, to the flow executing unit 301.

Next, the flow executing unit 301 sends a component execution request to the iteration component 401 (step S1209). Note that the execution request includes data and parameter information.

Here, the parameter information is the parameters 1121 through 1123 defined in "parameters" included in the process definition 1112 in the process flow information 1100 of FIG. 8.

When the iteration component 401 receives the component execution request, the iteration component 401 performs an execution process of the component (step S1210). Then, the iteration component 401 returns data indicating the processing result of the executed process, to the flow executing unit 301. Note that details of the execution process of the iteration component 401 are described below.

In the following description, it is assumed that, according to an execution process of the iteration component 401, electronic files have been acquired based on "url[0]" through "url[N−1]" indicating the storage destination URLs of the electronic files, and an OCR process has been performed on the electronic files.

Note that the data returned here includes, for example, information indicating that the execution process of the iteration component 401 has normally ended, and an N number of electronic files (N being the size of the storage destination list) that have undergone the OCR process.

When the flow executing unit 301 receives the data indicating the processing result of the execution process of the component, the flow executing unit 301 sends a request to acquire a component based on the process flow information 1100, to the component managing unit 302 (step S1211).

That is, the flow executing unit 301 sends a request to acquire the mail delivery component 403 corresponding to "sendMail" defined in "component" included in the process definition 1113 in the process flow information 1100 of FIG. 8, to the component managing unit 302.

When the component managing unit 302 receives the request to acquire a component, the component managing unit 302 generates the mail delivery component 403 (step S1212). Note that the mail delivery component 403 may be generated by using the API for generating a component defined in the component common I/F 400.

Then, the component managing unit 302 returns the generated mail delivery component 403 to the flow executing unit 301. That is, for example, the component managing unit 302 returns an address in a memory (for example, the RAM 14) in which the mail delivery component 403 is loaded, to the flow executing unit 301.

Next, the flow executing unit 301 sends a component execution request to the mail delivery component 403 (step S1213). Note that the execution request includes data and parameter information.

Here, the data includes the mail address "hoge@fuga.com" included in the input information.

Furthermore, the parameter information is "to":null defined in "parameters" included in the process definition 1113 in the process flow information 1100 of FIG. 8.

When the mail delivery component 403 receives the component execution request, the mail delivery component 403 performs an execution process of the component (step S1214). Then, the mail delivery component 403 returns data indicating the processing result of the executed process, to the flow executing unit 301.

Note that the data returned here includes, for example, information indicating that the execution process of the mail delivery component 403 has normally ended.

Figure 15:
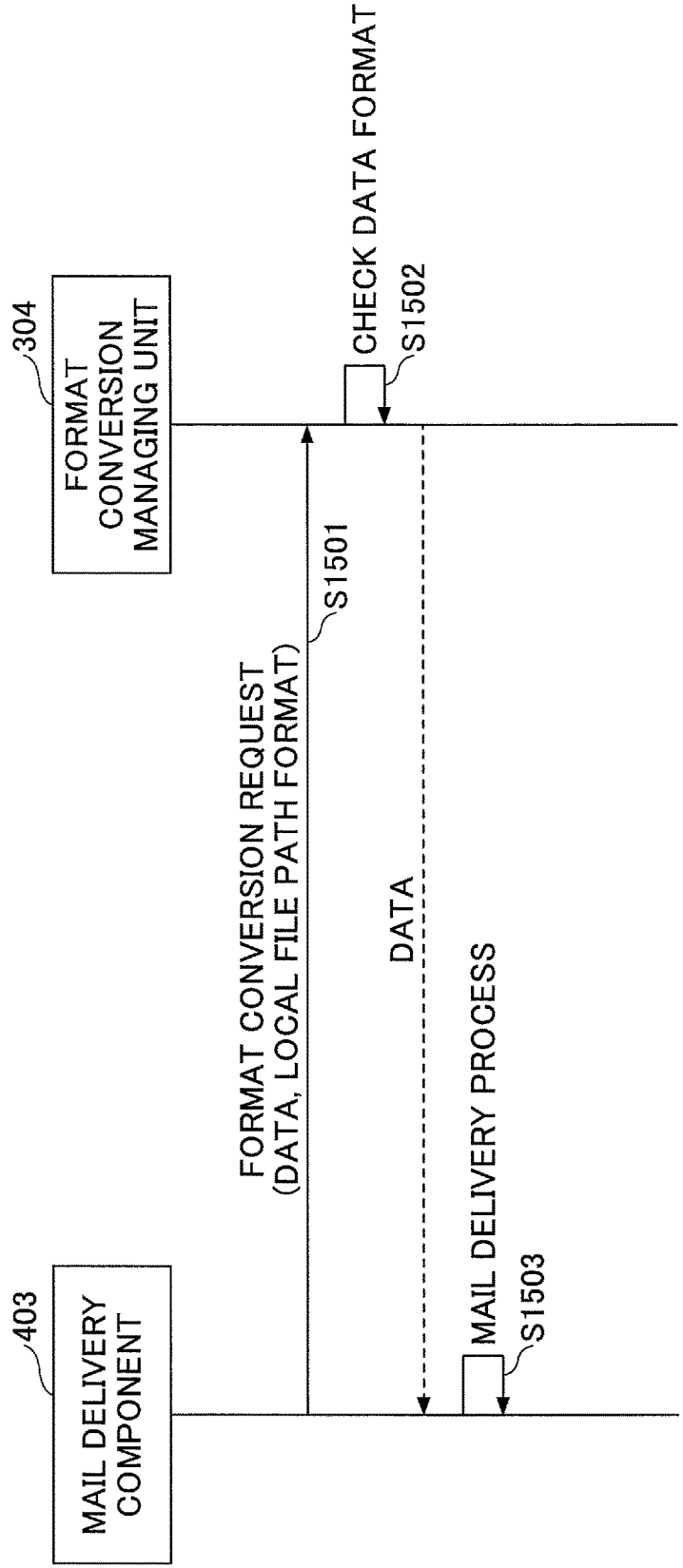
FIG. 15 is a sequence diagram of an example of the execution process of a mail delivery component according to the first embodiment of the present invention.

Here, a description is given of the execution process of the mail delivery component 403, by referring to FIG. 15. FIG. 15 is a sequence diagram of an example of the execution process of the mail delivery component 403 according to the present embodiment.

First, the mail delivery component 403 sends a format conversion request to the format conversion managing unit 304 (step S1501). Note that the format conversion request includes data and a specification of "LocalFilePath" indicating the data format that can be handled by the mail delivery component 403.

When the format conversion managing unit 304 receives the format conversion request, the format conversion managing unit 304 checks whether the data format of the data included in the format conversion request and the specified data format match each other (step S1502).

Here, the data format of the data included in the received format conversion request is "LocalFilePath", and the specified data format is also "LocalFilePath". Therefore, the format conversion managing unit 304 determines that the data format of the data included in the format conversion request and the specified data format match each other.

Then, the format conversion managing unit 304 returns the data included in the format conversion request to the mail delivery component 403. In this way, when the data formats are determined to match each other in the data format check, the format conversion managing unit 304 does not generate a format conversion.

When the mail delivery component 403 receives the data, the mail delivery component 403 executes a process by using parameter information (step S1503). That is, first, the mail delivery component 403 specifies a mail address "hoge@fuga.com" included in the data, at the parameter "to" included in the parameter information. Then, the mail delivery component 403 creates a mail to which the electronic file included in the data is attached, and sends the mail to the specified mail address. Note that the mail delivery component 403 creates the mail and executes the sending process by the mail delivering unit 131 of the document service unit 130.

Figure 16:
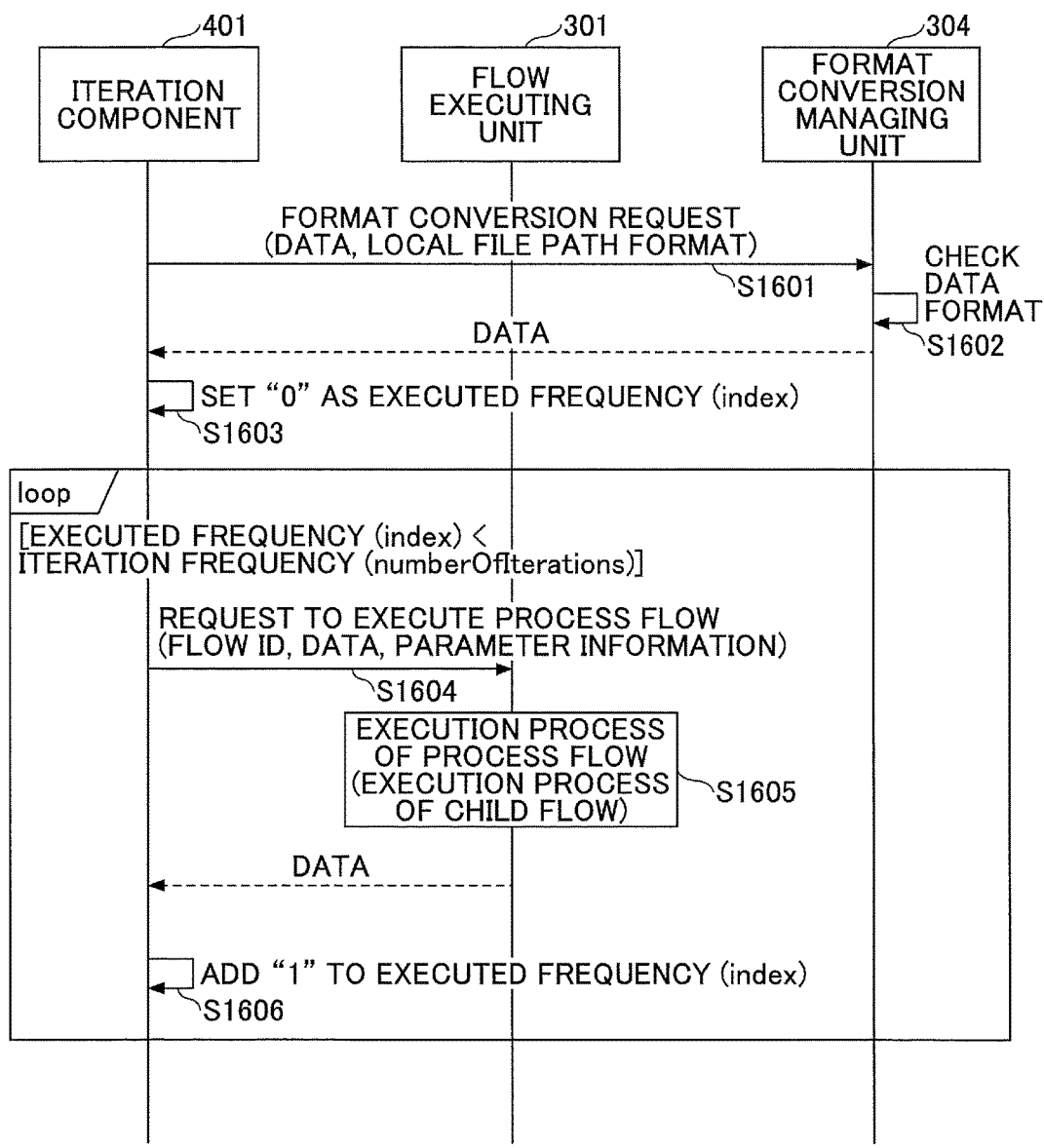
FIG. 16 is a sequence diagram of an example of the execution process of an iteration component according to the first embodiment of the present invention.

Here, a description is given of the execution process of the iteration component 401 at step S1210 described above, by referring to FIG. 16. FIG. 16 is a sequence diagram of an example of the execution process of the iteration component 401 according to the present embodiment.

First, the iteration component 401 sends a format conversion request to the format conversion managing unit 304 (step S1601). Note that the format conversion request includes data and a specification of "LocalFilePath" indicating the data format that can be handled by the iteration component 401.

When the format conversion managing unit 304 receives the format conversion request, the format conversion managing unit 304 checks whether the data format of the data included in the format conversion request and the specified data format match each other (step S1602).

Here, the data format of the data included in the received format conversion request is "LocalFilePath", and the specified data format is also "LocalFilePath". Therefore, the format conversion managing unit 304 determines that the data format of the data included in the format conversion request and the specified data format match each other.

Then, the format conversion managing unit 304 returns the data included in the format conversion request to the iteration component 401. In this way, when the data formats are determined to match each other in the data format check, the format conversion managing unit 304 does not generate a format conversion.

When the iteration component 401 receives the data, the iteration component 401 sets "0" as the variable "index" including the number of times of executing the child flow (executed frequency) (step S1603).

Next, when the variable "index" indicating the executed frequency is less than an iteration frequency "numberOfIterations" defined in the parameter 1123 included in the parameter information, the iteration component 401 executes the processes of steps S1604 through S1606. Note that in the present embodiment, "numberOfIterations" includes a definition to refer to the size of the storage destination list (that is, "result.getFileList.size") included in the processing result 171 of the list acquiring component 402. Therefore, in this case, the iteration frequency (numberOfIterations) is "N".

That is, first, the iteration component 401 sends a request to execute a process flow to the flow executing unit 301 (step S1604). Note that the execution request includes the flow ID defined in the parameter 1121, the data received from the format conversion managing unit 304, and the parameter information.

Here, the parameter information is the parameter 1122 included in the parameter information with respect to the iteration component 401. That is, the iteration component 401 sends the parameter 1122 in which the flow details of the child flow are defined, to the flow executing unit 301 as the parameter information.

Next, when the flow executing unit 301 receives the request to execute the process flow, the flow executing unit 301 executes a sequence of processes (that is, the child flow) based on the flow details included in the execution request (step S1605).

Then, the flow executing unit 301 returns data indicating the processing result of the sequence of processes to the iteration component 401.

Subsequently, when the iteration component 401 receives the data indicating the processing result of the child flow from the flow executing unit 301, the iteration component 401 adds "1" to the variable "index" indicating the executed frequency (step S1604).

As described above, as the iteration component 401 repeatedly sends a request to execute a process flow (child flow) to the flow executing unit 301, the child flow is repeatedly executed. Accordingly, the service providing system 10 according to the present embodiment is able to implement the iteration of one or more processes included in a process flow, by the iteration component 401.

Figure 17:
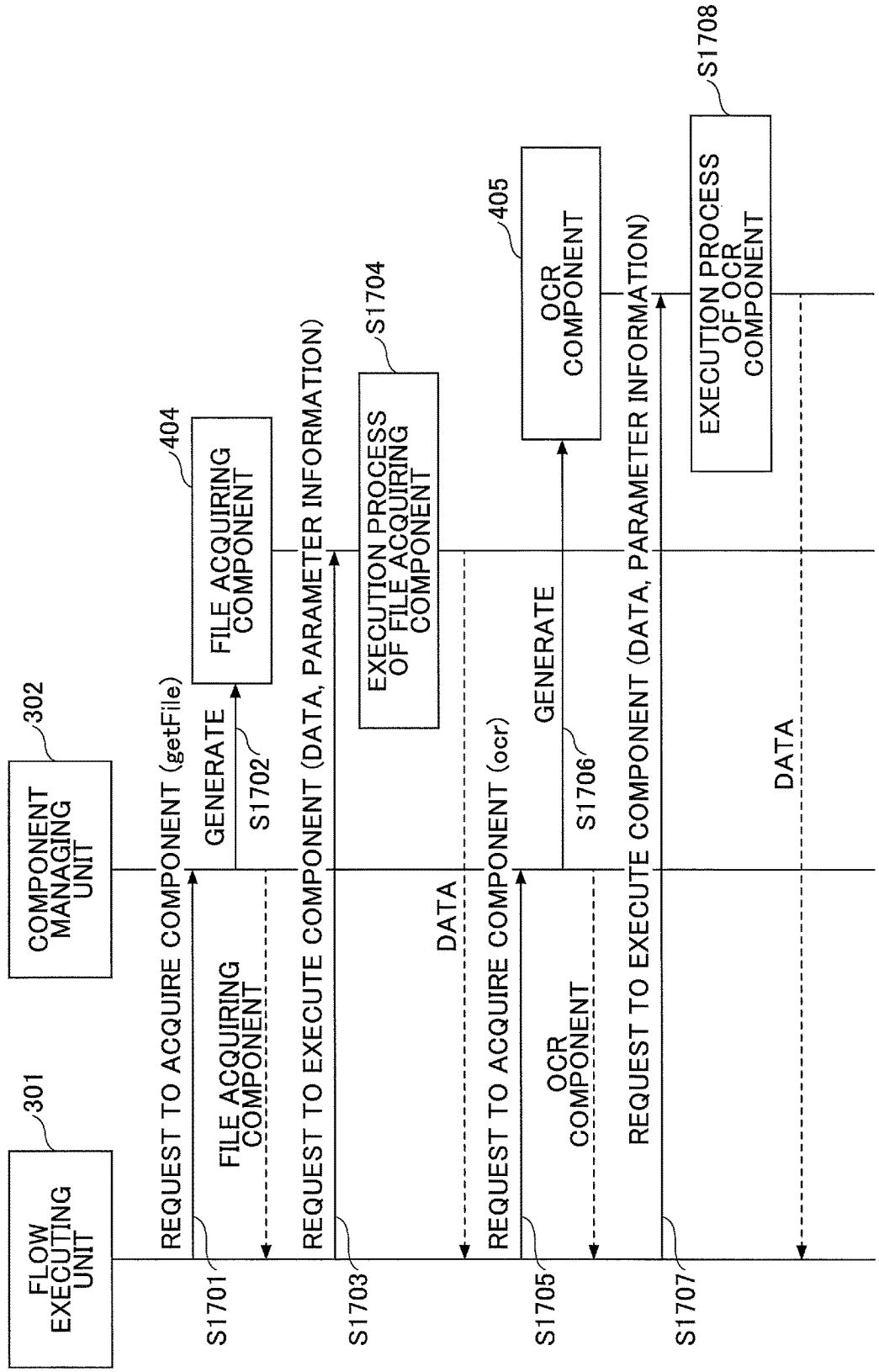
FIG. 17 is a sequence diagram of an example of the execution process of a child flow according to the first embodiment of the present invention.

Here, a description is given of the execution process of the child flow at step S1605 described above, by referring to FIG. 17. FIG. 17 is a sequence diagram of an example of the execution process of the child flow according to the present embodiment.

When the flow executing unit 301 receives the request to execute the process flow, the flow executing unit 301 sends a request to acquire a component based on the parameter information included in the execution request, to the component managing unit 302 (step S1701).

That is, the flow executing unit 301 sends a request to acquire the file acquiring component 404 corresponding to "getFile" defined in "component" included in the process definition 1131 in the parameter 1122, to the component managing unit 302.

When the component managing unit 302 receives the request to acquire a component, the component managing unit 302 generates the file acquiring component 404 (step S1702). Note that the file acquiring component 404 may be generated by using the API for generating a component defined in the component common I/F 400.

Then, the component managing unit 302 returns the generated file acquiring component 404 to the flow executing unit 301. That is, for example, the component managing unit 302 returns an address in a memory (for example, the RAM 14) in which the file acquiring component 404 is loaded, to the flow executing unit 301.

Next, the flow executing unit 301 sends a component execution request to the file acquiring component 404 (step S1703). Note that the execution request includes data and parameter information.

Here, the parameter information is "location":${result.getFileList.url[index]} defined in "parameters" included in the process definition 1131 in the parameter 1122.

When the file acquiring component 404 receives the component execution request, the file acquiring component 404 performs an execution process of the component (step S1704). That is, the file acquiring component 404 acquires the storage destination URL from the arrangement "url[index]" included in the processing result 171 stored in the resource management information 170D, via the resource managing unit 306. Then, the file acquiring component 404 specifies the storage destination URL at the parameter "location" included in the parameter information, and acquires (downloads) the electronic file. Note that "index" is a variable indicating the executed frequency as described above.

Then, the file acquiring component 404 returns data indicating the processing result of the executed process, to the flow executing unit 301. Note that the data returned here includes an electronic file is that has been acquired (downloaded) from the storage destination URL specified in the parameter "location".

Next, when the flow executing unit 301 receives the data, the flow executing unit 301 sends a request to acquire a component based on the parameter information included in the request to execute the process flow received from the iteration component 401, to the component managing unit 302 (step S1705).

That is, the flow executing unit 301 sends, to the component managing unit 302, a request to acquire the OCR component 405 corresponding to "ocr" defined in "component" included in the process definition 1132 in the parameter 1122.

When the component managing unit 302 receives the request to acquire a component, the component managing unit 302 generates the OCR component 405 (step S1706). Note that the OCR component 405 can be generated by using the API for generating components defined in the component common I/F 400.

Then, the component managing unit 302 returns the generated OCR component 405 to the flow executing unit 301. That is, the component managing unit 302 returns an address in a memory (for example, the RAM 14) in which the OCR component 405 is loaded, to the flow executing unit 301.

Next, the flow executing unit 301 sends a component execution request to the OCR component 405 (step S1707). Note that the execution request includes data and parameter information.

Here, the parameter information is "location":"English" defined in "parameters" included in the process definition 1132 in the parameter 1122.

When the OCR component 405 receives the component execution request, the OCR component 405 performs an execution process of the component (step S1708). That is, the OCR component 405 performs an OCR process on the electronic file included in the data. Note that the OCR component 405 executes the OCR process on the electronic file by the OCR processing unit 132 in the document service unit 130.

Then, the OCR component 405 returns data indicating the processing result of the executed process, to the flow executing unit 301. Note that the data returned here includes the electronic file that has undergone the OCR process.

As described above, in the service providing system 10 according to the present embodiment, another process flow (child flow) is repeatedly executed by the iteration component 401. Accordingly, the service providing system 10 according to the present embodiment is able to implement the iteration of one or more processes.

Moreover, the service providing system 10 according to the present embodiment is able to dynamically control the number of times of repeatedly executing another process flow by the iteration component 401, according to the processing result (that is, the processing result of another component) of a process included in the process flow.

Figure 18:
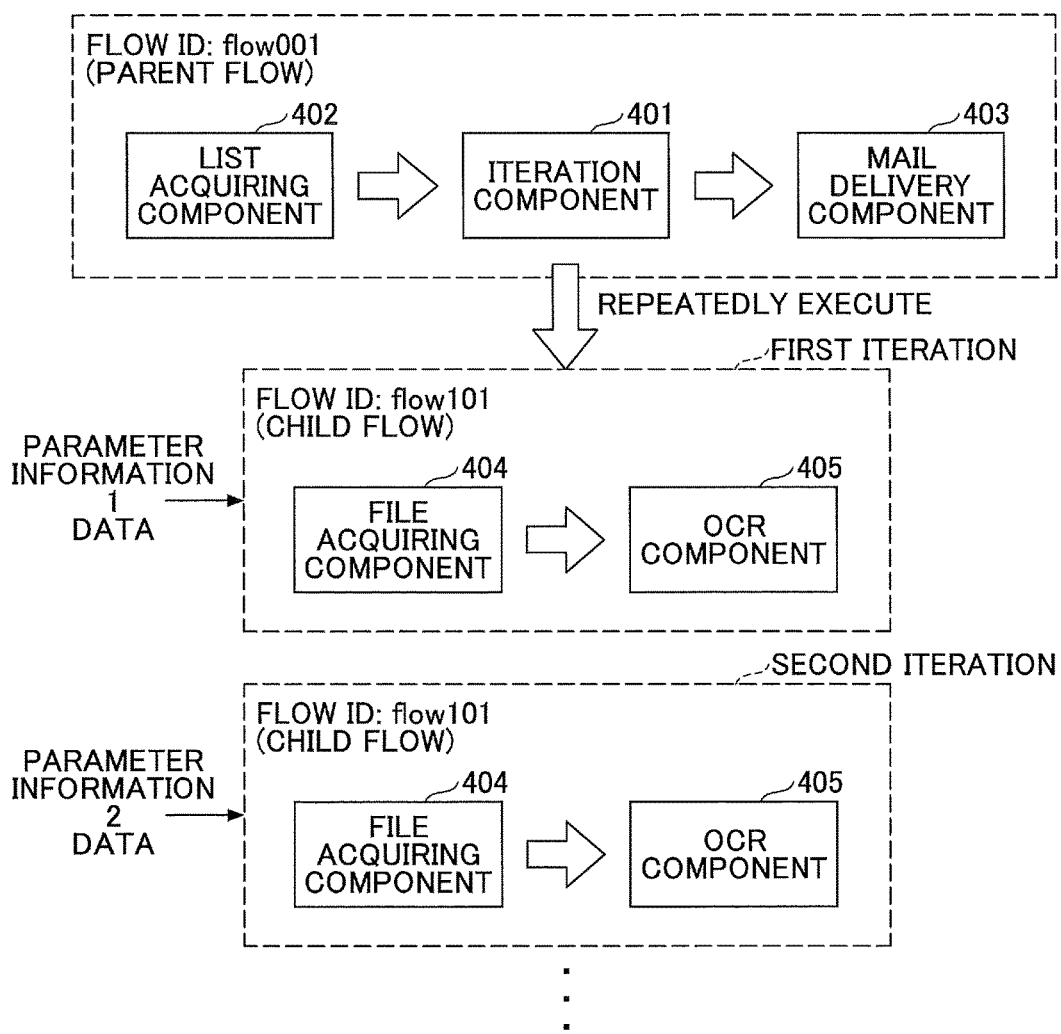
FIG. 18 is a diagram for describing another example of a process flow for implementing the "OCR delivery 1" service according to the first embodiment of the present invention.

Here, a description is given of another example of a process flow for implementing the "OCR delivery 1" service, by referring to FIG. 18. FIG. 18 is a diagram for describing another example of a process flow for implementing the "OCR delivery 1" service.

In the process flow illustrated in FIG. 18, different parameter information is used every time a child flow is executed by the iteration component 401. That is, in the process flow illustrated in FIG. 18, when a child flow is executed for the first time, the iteration component 401 uses "parameter information 1", and when a child flow is executed for the second time, the iteration component 401 uses "parameter information 2".

In this way, in the process flow illustrated in FIG. 18, the iteration component 401 uses parameter information according to the executed frequency, to execute a child flow.

Here, a description is given of the process flow information 1100 of the process flow illustrated in FIG. 18, by referring to FIG. 19. FIG. 19 illustrates another example of the process flow information 1100 (part 1).

As illustrated in FIG. 19, a parameter list 1124 is defined in "parameters" included in the process definition 1112 of the iteration component 401. Furthermore, the parameter list 1124 includes a parameter 1125 used when the executed frequency is "0", and a parameter 1126 used when the executed frequency is "1".

That is, the parameter 1125 and the parameter 1126 included in the parameter list 1124 are respectively the parameter used when executing the child flow for the first time and the parameter used when executing the child flow for the second time.

As described above, a parameter is defined for each executed frequency of the child flow, in the parameter list 1124. Accordingly, the iteration component 401 can execute a child flow by using different parameter information for each executed frequency of the child flow.

Note that in the process flow information 1100 illustrated in FIG. 19, a parameter 1127 for specifying the data to be used in the child flow is defined in the process definition 1112. When "useOriginalFile" in the parameter 1127 is "true", the iteration component 401 executes the child flow by using the data indicating the processing result of the execution process of the list acquiring component 402, as described in the execution process of the iteration component 401 of FIG. 16. On the other hand, when "useOriginalFile" in the parameter 1127 is "false", and the executed frequency is greater than or equal to 1, the iteration component 401 executes the next child flow by using the data indicating the processing result of the execution process of the child flow executed the last time.

As described above, when the executed frequency is greater than or equal to 1, the iteration component 401 executes the next child flow by using the data indicating the processing result of the execution process of the child flow executed the last time.

Figure 20:
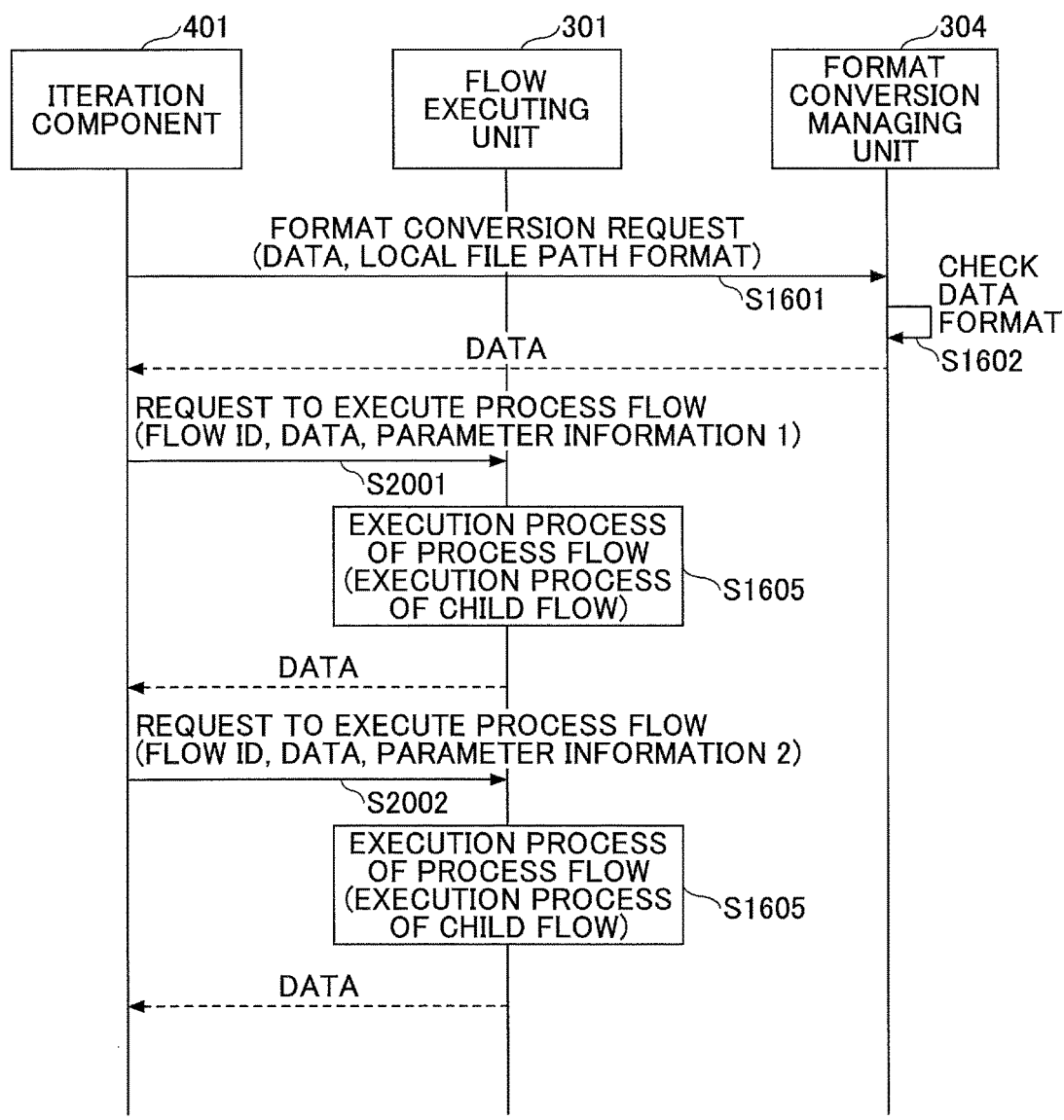
FIG. 20 is a sequence diagram of another example of the execution process of the iteration component according to the first embodiment of the present invention (part 1)

Here, a description is given of the execution process of the iteration component 401 in the process flow of FIG. 18, by referring to FIG. 20. FIG. 20 is a sequence diagram of another example of the execution process of the iteration component 401 according to the present embodiment (part 1). Note that in the following description, it is assumed that the number of times (iteration frequency) that the iteration component 401 executes the child flow is "2". Note that the processes of steps S1601, 1602, and S1605 are the same as those of FIG. 16, and therefore descriptions of these processes are omitted.

When the iteration component 401 receives the data from the format conversion managing unit 304, the iteration component 401 sends a request to execute a process flow to the flow executing unit 301 (step S2001). Note that the execution request includes the flow ID defined in the parameter 1121, the data, and parameter information 1.

Here, the parameter information 1 is the parameter 1125 in the parameter list 1124 included in the parameter information with respect to the iteration component 401. That is, the iteration component 401 sends the parameter 1125 that is used when the executed frequency is "0", as the parameter information 1, to the flow executing unit 301.

Accordingly, the flow executing unit 301 executes the sequence of processes based on the parameter information 1 (flow details defined as the parameter 1125).

Furthermore, when the iteration component 401 receives the data indicating the processing result of the execution process of the first process flow (child flow), the iteration component 401 sends a request to execute the second process flow (child flow) to the flow executing unit 301 (step S2002). Note that the execution request includes the flow ID defined in the parameter 1121, the data, and parameter information 2.

Here, the parameter information 2 is the parameter 1126 in the parameter list 1124 included in the parameter information with respect to the iteration component 401. That is, the iteration component 401 sends the parameter 1126 that is used when the executed frequency is "1", as the parameter information 2, to the flow executing unit 301.

Accordingly, the flow executing unit 301 executes the sequence of processes based on the parameter information 2 (flow details defined as the parameter 1126).

As described above, the iteration component 401 can send a request to execute a child flow specifying different parameter information for each executed frequency, to the flow executing unit 301.

Here, a description is given of another example of the process flow information 1100 of the process flow for implementing the "OCR delivery 1" service, by referring to FIG. 21. FIG. 21 illustrates another example of the process flow information 1100 (part 2).

As illustrated in FIG. 21, in "parameters" included in the process definition 1112 of the iteration component 401, a parameter 1128 for determining whether to skip the next child flow is defined. In the parameter 1128, "(conditional expression)" (for example, a logical formula) for executing the next child flow is defined. Accordingly, the iteration component 401 can execute the next child flow when "(conditional expression)" is satisfied, and skip the execution of the next child flow when "(conditional expression)" is not satisfied.

Note that in the parameter 1128, for example, "breakCondition":"(conditional expression)", which indicates whether to cancel the repeated execution of the child flow, may be defined. In this case, in "(conditional expression)", a conditional expression for cancelling the repeated execution of the child flow is defined. Accordingly, the iteration component 401 can cancel the repeated execution of the child flow, when "(conditional expression)" defined in the parameter 1128 is satisfied.

Figure 22:
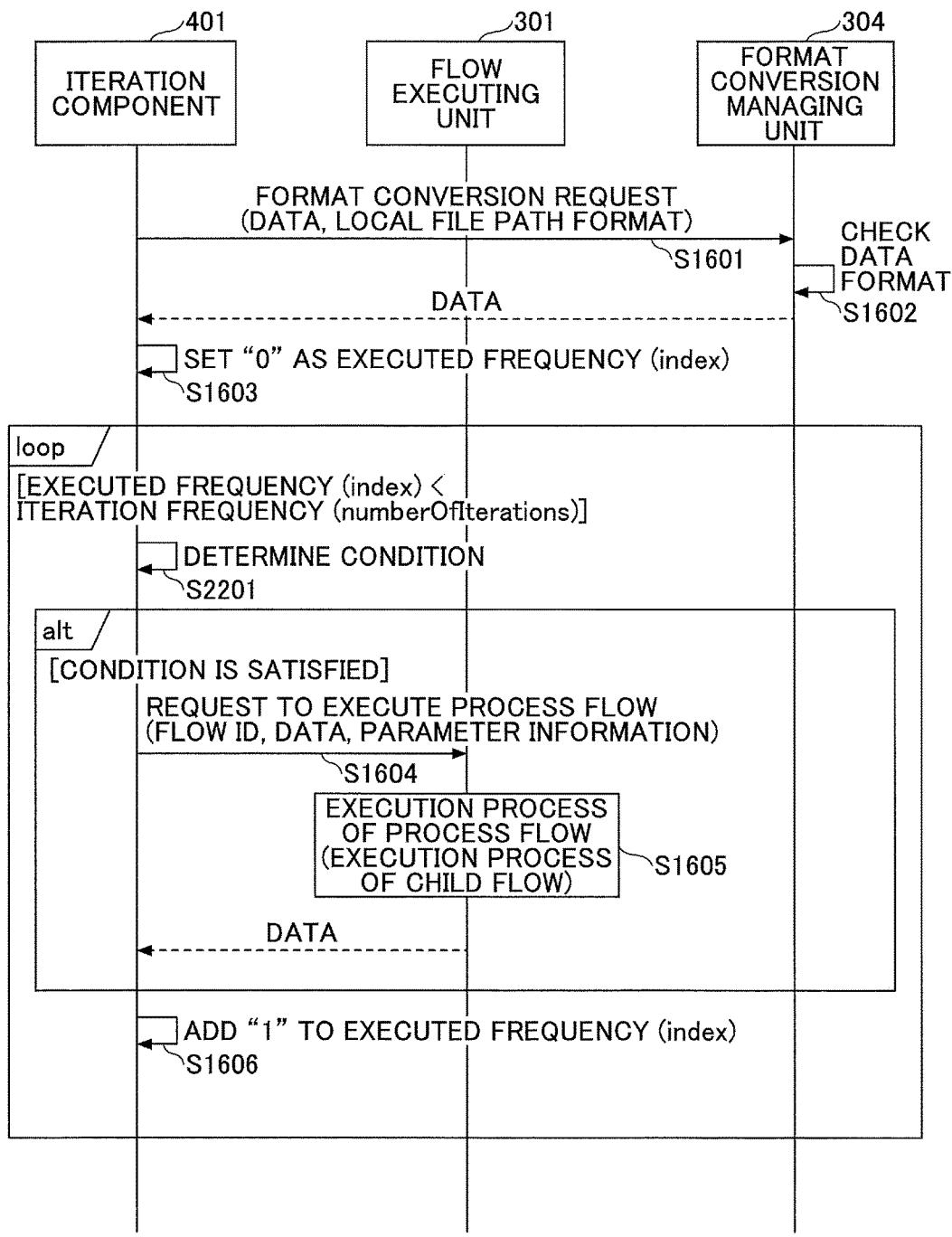
FIG. 22 is a sequence diagram of another example of the execution process of the iteration component according to the first embodiment of the present invention (part 2)

Here, a description is given of the execution process of the iteration component 401 in the process flow information 1100 of FIG. 21, by referring to FIG. 22. FIG. 22 is a sequence diagram of another example of the execution process of the iteration component 401 according to the present embodiment (part 2). Note that the processes of steps S1601 through S1603 and steps S1605 and S1606 are the same as those of FIG. 16, and therefore descriptions of these processes are omitted.

After step S1603, the iteration component 401 determines whether the "(conditional expression)" defined in the parameter 1128 is satisfied (step S2201).

In step S2201, when the iteration component 401 determines that the "(conditional expression)" is satisfied, the iteration component 401 executes the processes of steps S1604 and S1605.

On the other hand, in step S2201, when the iteration component 401 determines that the "(conditional expression)" is not satisfied, the iteration component 401 executes the process of step S1606. That is, the iteration component 401 does not execute the child flow, and adds "1" to the variable "index" indicating the executed frequency.

Accordingly, for example, when the variable "index" indicating the executed frequency is "n", and "(conditional expression)" is not satisfied, the iteration component 401 can skip the execution of the n+1th child flow.

As described above, the service providing system 10 according to the present embodiment can repeatedly execute one or more processes in a sequence of processes for implementing a service.

Moreover, the service providing system 10 according to the present embodiment is able to dynamically change the number of times of repeatedly executing one or more processes, according to the processing result of another process. Furthermore, the service providing system 10 according to the present embodiment is able to dynamically determine data and parameters, etc., used in the one or more processes, according to the number of times of executing the one or more processes.

Accordingly, the service providing system 10 according to the present embodiment can provide various services implemented by the iteration of one or more processes.

Second Embodiment

Next, a description is given of a second embodiment. In the sequence of processes of the related art, it has not been possible to call and execute another sequence of processes. Therefore, a component for executing the processes in the sequence of processes has not been able to use the processing results obtained by executing another sequence of processes. Thus, the second embodiment is for executing a sequence of processes including the operation of calling another sequence of processes.

Note that in the second embodiment, mainly the points that are different from those of the first embodiment are described. The functions and processes that are substantially the same as those of the first embodiment are denoted by the same reference numerals, and descriptions of the same elements are omitted.

<Service Provided by Service Providing System>

First, a description is given of a service provided by the service providing system 10 according to the present embodiment.

The service providing system 10 according to the present embodiment provides a service of acquiring a storage destination list of electronic files in the external storage system 30, acquiring the newest electronic file based on the acquired list, performing an OCR process on the acquired electronic file, and delivering the electronic file that has undergone the OCR process, by mail.

In the following description, it is assumed that the service providing system 10 according to the present embodiment provides the above-described service (hereinafter, also referred to as an "OCR delivery 2" service or simply "OCR delivery 2").

However, a service provided by the service providing system 10 is not so limited. For example, the service providing system 10 may acquire the storage destination list of electronic files in the external storage system 30, acquire the newest electronic file based on the acquired list, edit the acquired electronic file (for example, adding predetermined information, etc.), and deliver the edited electronic file by mail.

Furthermore, for example, the service providing system 10 may acquire the storage destination list of electronic files in the external storage system 30, acquire the newest electronic file based on the acquired list, compress the acquired electronic file, and deliver the compressed electronic file by mail.

As described above, the service providing system 10 according to the present embodiment provides various services in cooperation with the external storage system 30.

<Functional Configuration>

Figure 23:
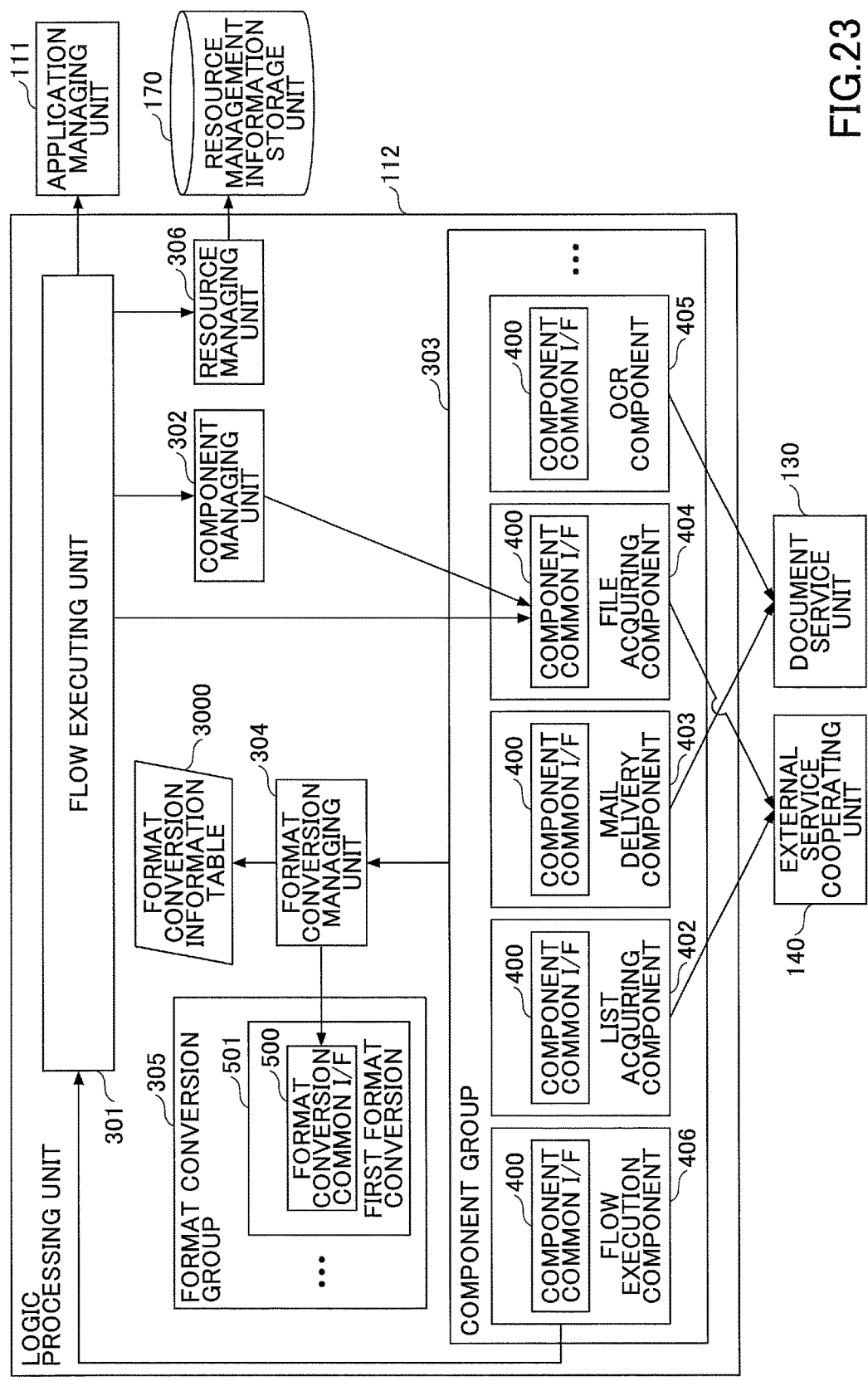
FIG. 23 illustrates a functional configuration of an example of the logic processing unit according to a second embodiment of the present invention.

Next, a description is given of a detailed functional configuration of the logic processing unit 112, by referring to FIG. 23. FIG. 23 illustrates a functional configuration of an example of the logic processing unit 112 according to the present embodiment.

The component group 303 of the logic processing unit 112 illustrated in FIG. 23 includes a flow execution component 406. The flow execution component 406 is a component for executing another process flow.

Here, a description is given of the process flow information 1100 included in the application information 1000 for providing the "OCR delivery 2" service, by referring to FIG. 24. FIG. 24 illustrates an example of the process flow information 1100 in which a process flow (parent flow) for implementing the "OCR delivery 2" service is defined. Note that in the following, a process flow based on the process flow information 1100 illustrated in FIG. 24 is also referred to as a "parent flow", and another process flow that is executed by being called by the parent flow is also referred to as a "child flow".

The process flow information 1100 illustrated in FIG. 24 is information in which a sequence of processes (process flow) for implementing the "OCR delivery 2" service is defined.

The process flow information 1100 illustrated in FIG. 24 includes a flow ID 1201 indicating identification information uniquely identifying the process flow information 1100, and a flow detail 1202 defining the process content of each process included in the process flow.

The flow detail 1202 includes process definitions 1211 through 1213 respectively defining the processes included in the process flow.

Specifically, "component" of the process definition 1211 defines "getFileList" indicating to execute a process by the list acquiring component 402. Furthermore, "parameters" defines a parameter "storage" with respect to the list acquiring component 402.

Similarly, "component" of the process definition 1213 defines "sendMail" indicating to execute a process by the mail delivery component 403. Furthermore, "parameters" defines a parameter "to" with respect to the mail delivery component 403. Similarly, "component" of the process definition 1212 defines "execute" indicating to execute a process by the flow execution component 406. Furthermore, "parameters" defines a parameter 1221 with respect to the flow execution component 406.

Here, the parameter 1221 is a parameter defining the flow ID of another process flow that the flow execution component 406 executes. As described above, in the process definition 1212 defining a process by the flow execution component 406, a flow ID of another process flow to be executed by the flow execution component 406 is defined. Accordingly, as described below, the flow execution component 406 can execute another process flow.

Figure 25:
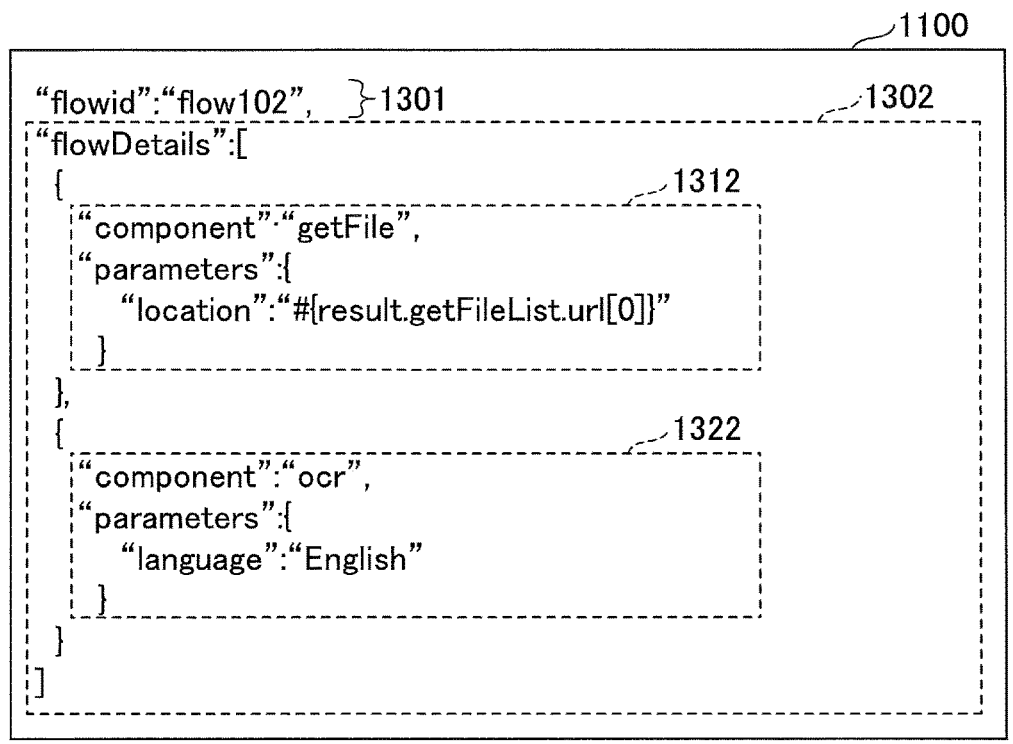
FIG. 25 illustrates an example of process flow information in which a process flow (child flow) for implementing the "OCR delivery 2" service is defined, according to the second embodiment of the present invention.

Here, a description is given of the process flow information 1100 of another process flow (child flow) to be executed by the flow execution component 406 defined in the process flow information 1100 of FIG. 24, by referring to FIG. 25. FIG. 25 illustrates an example of the process flow information 1100 in which a process flow (child flow) for implementing the "OCR delivery 2" service is defined.

The process flow information 1100 illustrated in FIG. 25 is the process flow information 1100 for executing another process flow that is called by a sequence of processes based on the process flow information 1100 of FIG. 24.

The process flow information 1100 illustrated in FIG. 25 includes a flow ID 1301 indicating identification information uniquely identifying the process flow information 1100, and a flow detail 1302 defining the process content of each process included in the process flow.

The flow detail 1302 includes process definitions 1312 through 1322 respectively defining the processes included in the process flow.

Specifically, "component" of the process definition 1312 defines "getFile" indicating to execute a process by the file acquiring component 404. Furthermore, "parameters" defines a parameter "location" with respect to the file acquiring component 404. Note that the parameter "location" is a parameter in which information indicating the storage destination list of electronic files is defined.

Similarly, "component" of the process definition 1322 defines "ocr" indicating to execute a process by the OCR component 405. Furthermore, "parameters" defines a parameter "language" with respect to the OCR component 405.

Figure 26:
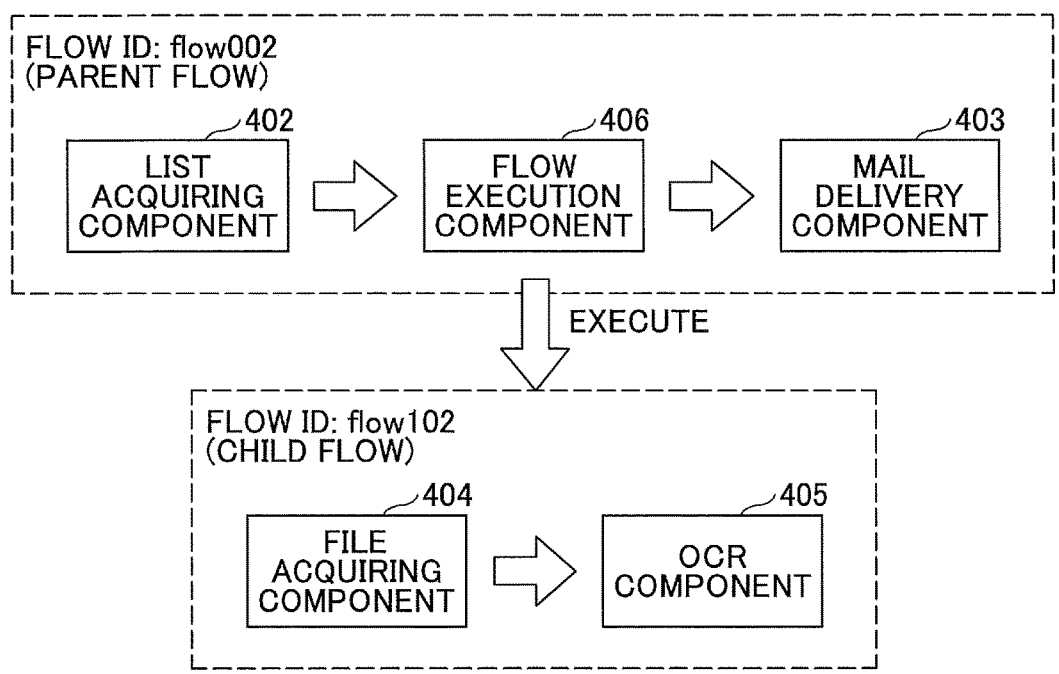
FIG. 26 is a diagram for describing an example of a process flow for implementing the "OCR delivery 2" service according to the second embodiment of the present invention.

Here, a process flow based on the process flow information 1100 illustrated in FIG. 24 (that is, a process flow for implementing the "OCR delivery 2" service) is illustrated in FIG. 26. FIG. 26 is a diagram for describing an example of a process flow for implementing the "OCR delivery 2" service.

As illustrated in FIG. 26, in the process flow for implementing the "OCR delivery 2" service, first, the list acquiring component 402 acquires the storage destination list of electronic files stored in the external storage system 30.

Next, the flow execution component 406 causes the execution of the child flow that is the process flow based on the process flow information 1100 of FIG. 25. That is, the flow execution component 406 causes the file acquiring component 404 to execute a process and causes the OCR component 405 to execute a process. Accordingly, the newest electronic file is acquired (downloaded) based on the storage destination of the newest electronic file among the storage destinations included in the storage destination list, and an OCR process is performed on the electronic file.

Lastly, the mail delivery component 403 delivers the electronic file that as undergone the OCR process, by mail.

As described above, in the "OCR delivery 2" service, the flow execution component 406 of the parent flow causes the execution of a child flow (another process flow), to implement the calling of another process flow in the process flow. Note that when the flow execution component 406 is included in the child flow, yet another process flow (grandchild flow) is to be executed.

<Process Details>

Next, a description is given of details of processes by the information processing system 1 according to the present embodiment.

Figure 27:
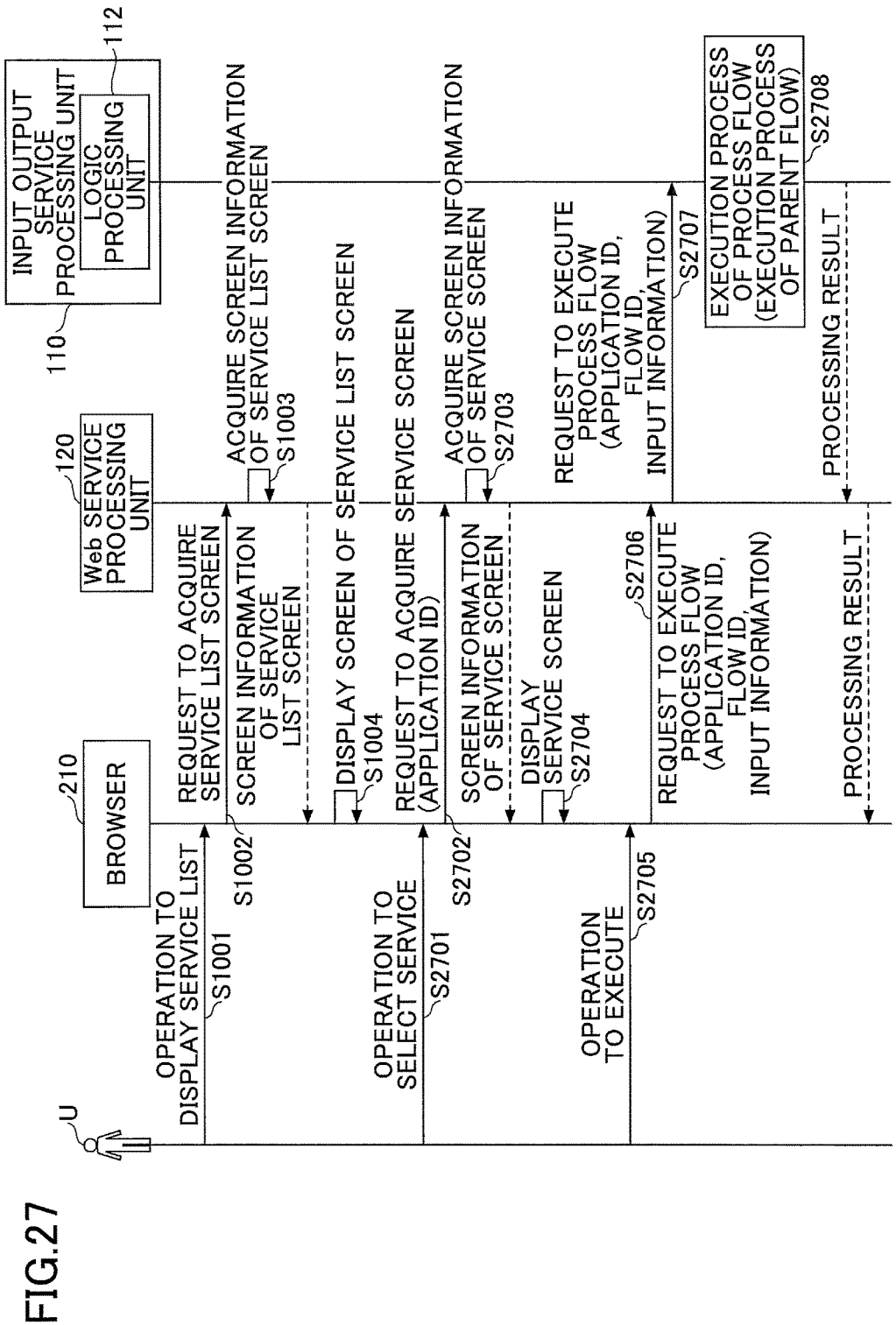
FIG. 27 is a sequence diagram of an example of the overall process of a process performed when using the "OCR delivery 2" service according to the second embodiment of the present invention.

In the following, a description is given of a process performed when a user U of the device 20 uses the browser 210 to use the "OCR delivery 2" service provided by the service providing system 10, by referring to FIG. 27. FIG. 27 is a sequence diagram of an example of the overall process of a process performed when using the "OCR delivery 2" service according to the present embodiment. Note that steps S1001 through S1004 of FIG. 27 are the same as those of FIG. 10, and therefore descriptions of these steps are omitted.

After step S1004, the user U selects "OCR delivery 2" from the service name list 4101 in the service list screen 4100, and performs an operation of selecting the service (step S2701).

When the browser 210 of the device 20 accepts the operation of selecting the service, the browser 210 sends a request to acquire a service screen to the web service processing unit 120 (step S2702). Note that the acquisition request includes an application ID of the application information 1000 for providing the "OCR delivery 2" service selected by the user U.

When the web service processing unit 120 receives the request to acquire a service screen, the web service processing unit 120 acquires the screen information 2000 (screen information 2000 of service screen) stored in the screen information storage unit 160 in association with the application ID included in the acquisition request (step S2703). Then, the web service processing unit 120 returns the acquired screen information 2000 to the browser 210.

Figure 28:
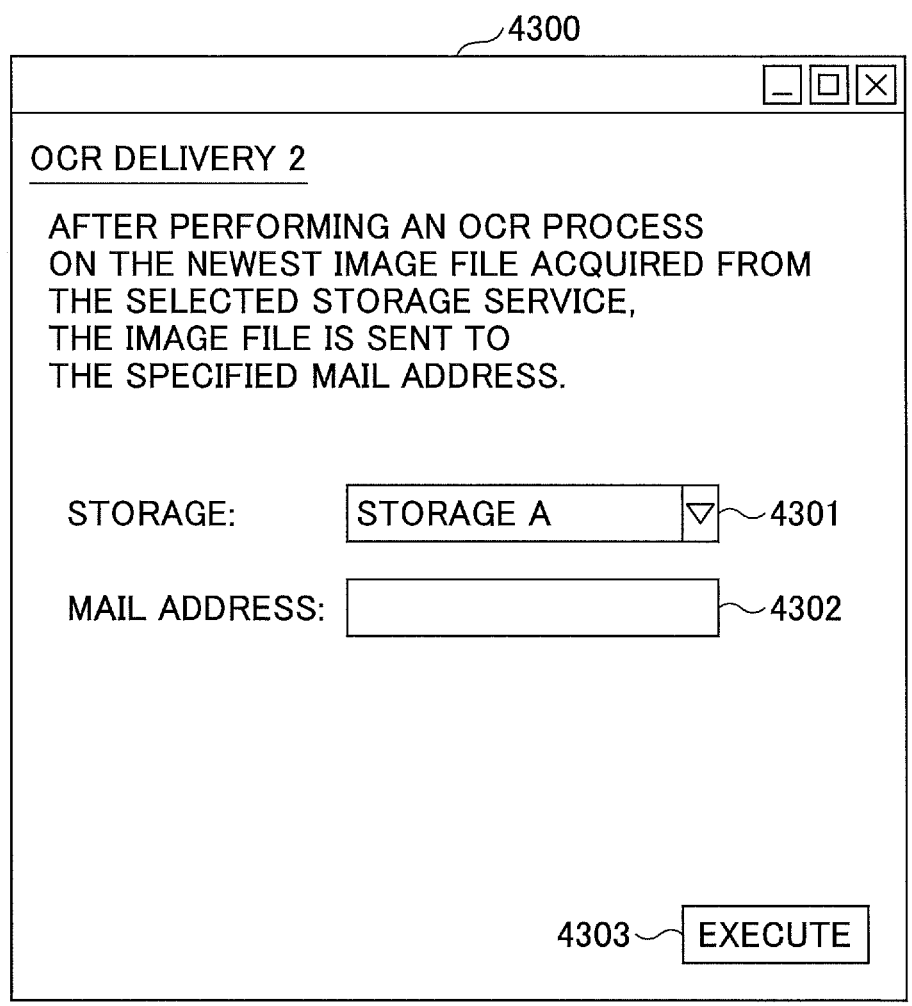
FIG. 28 illustrates an example of a service screen of the "OCR delivery 2" service according to the second embodiment of the present invention.

When the browser 210 of the device 20 receives the screen information 2000 of the service screen, the browser 210 causes the operation panel 22 to display a service screen 4300, for example, illustrated in FIG. 28, based on the screen information 2000 (step S2704).

The service screen 4300 illustrated in FIG. 28 is a screen for using the "OCR delivery 2" service selected by the user U. The service screen 4300 illustrated in FIG. 28 includes a storage specification field 4301, a mail address specification field 4302, and an execution button 4303.

Here, the storage specification field 4301 is a field for specifying a storage service name of the external storage system 30 from which the storage destination list of electronic files is to be acquired. The mail address specification field 4302 is a field for specifying the destination (mail address) to which the electronic file that has undergone the OCR process is to be delivered by mail. Note that the service screen 4300 may include, for example, a CC specification field and a BCC specification field, etc., for specifying a destination to which the electronic file, which has undergone an OCR process, is to be delivered by mail by way of CC or BCC.

Next, in the service screen 4300, the user U specifies a desired service name in the storage specification field 4301, specifies a desired mail address in the mail address specification field 4302, and presses the execution button 4303 (step S2705).

Here, in the following description, it is assumed that the user U has specified "storage A" in the storage specification field 4301, has specified a mail address "hoge@fuga.com" in the mail address specification field 4302, and has pressed the execution button 4303.

When the browser 210 of the device 20 accepts the operation of pressing the execution button 4303, the browser 210 sends a request to execute a process flow for executing the "OCR delivery 2" service to the web service processing unit 120 (step S2706).

Note that the execution request includes an application ID of the application information 1000 for providing the "OCR delivery 2" service and a flow ID of the process flow information 1100 for implementing the service. Furthermore, the execution request includes input information (that is, the storage service name and the mail address) that has been input in the service screen 4300 by the user U.

When the web service processing unit 120 receives the request to execute a process flow, the web service processing unit 120 sends the execution request to the logic processing unit 112 of the input output service processing unit 110 (step S2707).

When the logic processing unit 112 of the input output service processing unit 110 receives the request to execute the process flow, the logic processing unit 112 executes a sequence of processes (that is, a parent flow) based on the process flow information 1100 corresponding to the application ID and the flow ID included in the execution request (step S2708).

Then, the logic processing unit 112 returns the processing result of the sequence of processes to the browser 210 of the device 20 via the web service processing unit 120.

Accordingly, in the service providing system 10 according to the present embodiment, the sequence of processes for implementing the "OCR delivery 2" service is executed, and the service is provided to the device 20.

Figure 29:
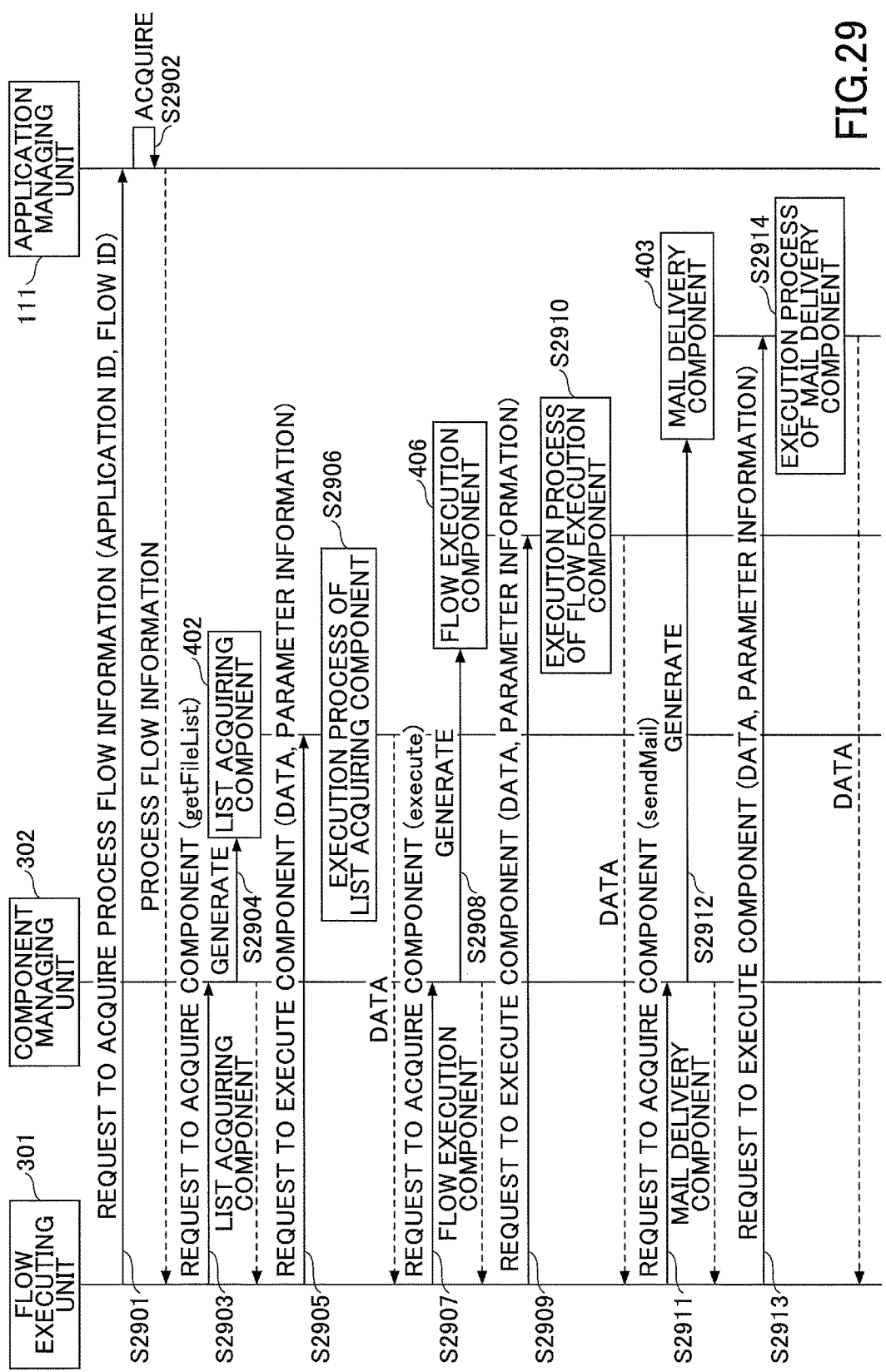
FIG. 29 is a sequence diagram of an example of a process of executing the parent flow according to the second embodiment of the present invention.

Here, a detailed description is given of the process of executing the process flow of step S2708 described above (the process of executing the parent flow), by referring to FIG. 29. FIG. 29 is a sequence diagram of an example of a process of executing the parent flow according to the present embodiment.

When the flow executing unit 301 receives a request to execute the process flow, the flow executing unit 301 sends a request to acquire process flow information to the application managing unit 111 (step S2901). Note that the acquisition request includes the application ID and the flow ID included in the request to execute the process flow received from the web service processing unit 120.

When the application managing unit 111 receives the request to acquire the process flow information, the application managing unit 111 acquires the process flow information 1100 corresponding to the application ID and the flow ID included in the acquisition request, from the application information storage unit 150 (step S2902). Then, the application managing unit 111 returns the acquired process flow information 1100 to the flow executing unit 301. Accordingly, the process flow information 1100 illustrated in FIG. 24 is returned to the flow executing unit 301.

When the flow executing unit 301 receives the process flow information 1100 from the application managing unit 111, the flow executing unit 301 sends a request to acquire a component based on the process flow information 1100, to the component managing unit 302 (step S2903).

That is, the flow executing unit 301 sends, to the component managing unit 302, a request to acquire the list acquiring component 402 corresponding to "getFileList" defined in "component" included in the process definition 1211 in the process flow information 1100 of FIG. 24.

When the component managing unit 302 receives the request to acquire a component, the component managing unit 302 generates the list acquiring component 402 (step S2904). Note that the list acquiring component 402 can be generated by using the API for generating components defined in the component common I/F 400.

Then, the component managing unit 302 returns the generated list acquiring component 402 to the flow executing unit 301. That is, the component managing unit 302 returns an address in a memory (for example, the RAM 14) in which the list acquiring component 402 is loaded, to the flow executing unit 301.

Next, the flow executing unit 301 sends a component execution request to the list acquiring component 402 (step S2905). Note that the execution request includes data and parameter information.

Here, the data is input information received from the browser 210, as a data format "InputStream" (that is, a storage service name "storage A").

Furthermore, the parameter information is "storage":null defined in "parameters" included in the process definition 1211 in the process flow information 1100 of FIG. 24.

When the list acquiring component 402 receives the component execution request, the list acquiring component 402 performs an execution process of the component (step S2906). Then, the list acquiring component 402 returns data indicating the processing result of the executed process, to the flow executing unit 301.

Note that the data returned here includes, for example, information indicating that the execution process of the list acquiring component 402 has normally ended. The execution process of the list acquiring component 402 is the same as that described by referring to FIG. 13.

Next, when the flow executing unit 301 receives the data indicating the processing result of the execution process of the component, the flow executing unit 301 sends a request to acquire a component based on the process flow information 1100, to the component managing unit 302 (step S2907).

That is, the flow executing unit 301 sends a request to acquire the flow execution component 406 corresponding to "execute" defined in "component" included in the process definition 1212 in the process flow information 1100 of FIG. 24, to the component managing unit 302.

When the component managing unit 302 receives the request to acquire a component, the component managing unit 302 generates the flow execution component 406 (step S2908). Note that the flow execution component 406 may be generated by using the API for generating a component defined in the component common I/F 400.

Then, the component managing unit 302 returns the generated flow execution component 406 to the flow executing unit 301. That is, for example, the component managing unit 302 returns an address in a memory (for example, the RAM 14) in which the flow execution component 406 is loaded, to the flow executing unit 301.

Next, the flow executing unit 301 sends a component execution request to the flow execution component 406 (step S2909). Note that the execution request includes data and parameter information.

Here, the parameter information is the parameter 1221 defined in "parameters" included in the process definition 1212 in the process flow information 1100 of FIG. 24.

When the flow execution component 406 receives the component execution request, the flow execution component 406 performs an execution process of the component (step S2910). Then, the flow execution component 406 returns data indicating the processing result of the executed process, to the flow executing unit 301. Note that details of the execution process of the flow execution component 406 are described below.

In the following description, it is assumed that, according to an execution process of the flow execution component 406, the child process has been executed, the newest electronic file is acquired based on "url[0]" indicating the storage destination URL of the electronic file, and an OCR process has been performed on the electronic file.

Note that the data returned here includes, for example, information indicating that the execution process of the flow execution component 406 has normally ended, and the electronic file that has undergone the OCR process.

When the flow executing unit 301 receives the data indicating the processing result of the execution process of the component, the flow executing unit 301 sends a request to acquire a component based on the process flow information 1100, to the component managing unit 302 (step S2911).

That is, the flow executing unit 301 sends a request to acquire the mail delivery component 403 corresponding to "sendMail" defined in "component" included in the process definition 1213 in the process flow information 1100 of FIG. 24, to the component managing unit 302.

When the component managing unit 302 receives the request to acquire a component, the component managing unit 302 generates the mail delivery component 403 (step S2912). Note that the mail delivery component 403 may be generated by using the API for generating a component defined in the component common I/F 400.

Then, the component managing unit 302 returns the generated mail delivery component 403 to the flow executing unit 301. That is, for example, the component managing unit 302 returns an address in a memory (for example, the RAM 14) in which the mail delivery component 403 is loaded, to the flow executing unit 301.

Next, the flow executing unit 301 sends a component execution request to the mail delivery component 403 (step S2913). Note that the execution request includes data and parameter information.

Here, the data includes the mail address "hoge@fuga.com" included in the input information. Furthermore, the parameter information is "to":null defined in "parameters" included in the process definition 1213 in the process flow information 1100 of FIG. 24.

When the mail delivery component 403 receives the component execution request, the mail delivery component 403 performs an execution process of the component (step S2914). Then, the mail delivery component 403 returns data indicating the processing result of the executed process, to the flow executing unit 301.

Note that the data returned here includes, for example, information indicating that the execution process of the mail delivery component 403 has normally ended. The execution process of the mail delivery component 403 the same as that described by referring to FIG. 15.

Figure 30:
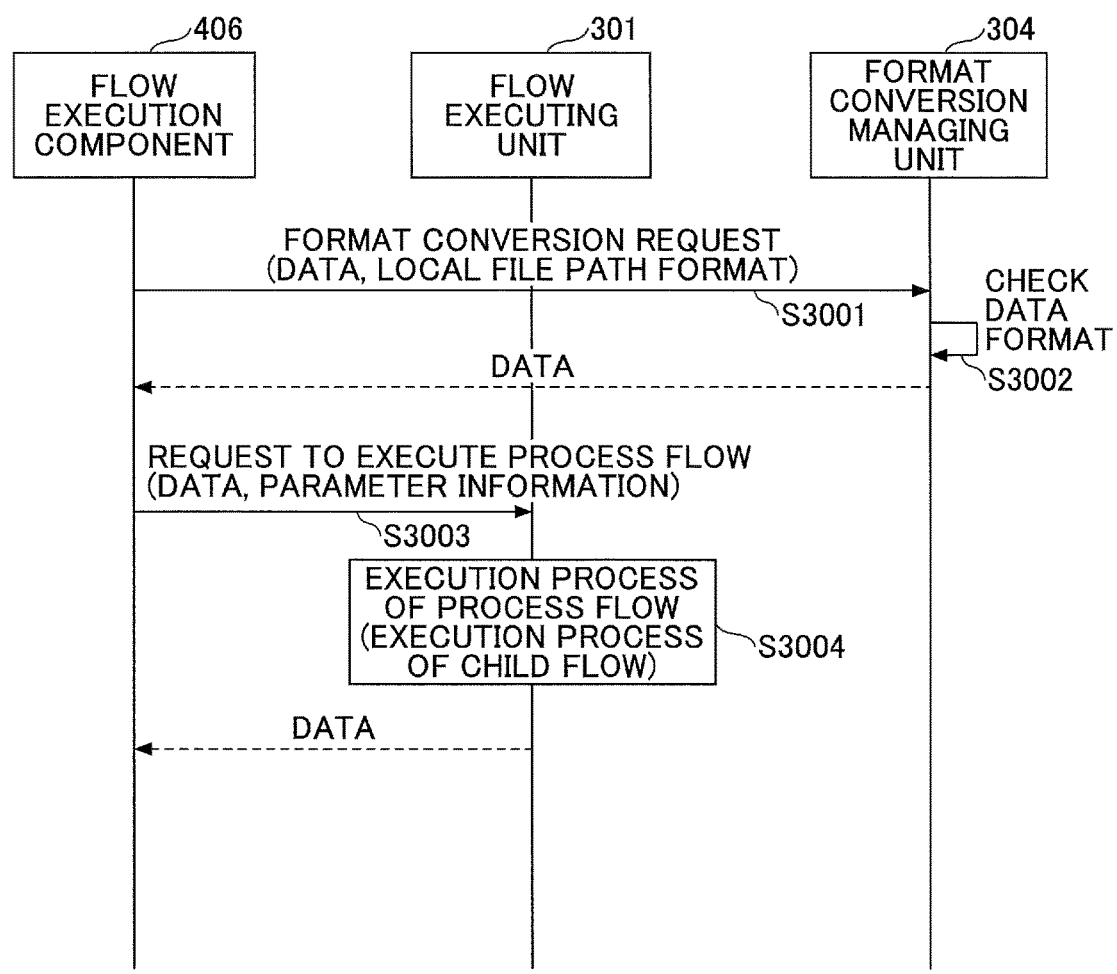
FIG. 30 is a sequence diagram of an example of the execution process of a flow execution component according to the second embodiment of the present invention.

Here, a description is given of the execution process of the flow execution component 406 at step S2910 described above, by referring to FIG. 30. FIG. 30 is a sequence diagram of an example of the execution process of the flow execution component 406 according to the present embodiment.

First, the flow execution component 406 sends a format conversion request to the format conversion managing unit 304 (step S3001). Note that the format conversion request includes data and a specification of "LocalFilePath" indicating the data format that can be handled by the flow execution component 406.

When the format conversion managing unit 304 receives the format conversion request, the format conversion managing unit 304 checks whether the data format of the data included in the format conversion request and the specified data format match each other (step S3002).

Here, the data format of the data included in the received format conversion request is "LocalFilePath", and the specified data format is also "LocalFilePath". Therefore, the format conversion managing unit 304 determines that the data format of the data included in the format conversion request and the specified data format match each other.

Then, the format conversion managing unit 304 returns the data included in the format conversion request to the flow execution component 406. In this way, when the data formats are determined to match each other in the data format check, the format conversion managing unit 304 does not generate a format conversion.

When the flow execution component 406 receives the data, the flow execution component 406 sends a request to execute a process flow to the flow executing unit 301 (step S3003). Note that the execution request includes the data and parameter information received from the format conversion managing unit 304. Here, the parameter information is the flow ID defined in the parameter 1221.

Next, when the flow executing unit 301 receives the request to execute the process flow, the flow executing unit 301 executes a sequence of processes (that is, the child flow) based on the process flow information 1100 of the flow ID included in the execution request (step S3004).

Then, the flow executing unit 301 returns data indicating the processing result of the sequence of processes to the flow execution component 406.

As described above, as the flow execution component 406 sends a request to execute another process flow (child flow) to the flow executing unit 301, the child flow is executed. Accordingly, the service providing system 10 according to the present embodiment is able to implement the calling of another process flow, by the flow execution component 406.

Figure 31:
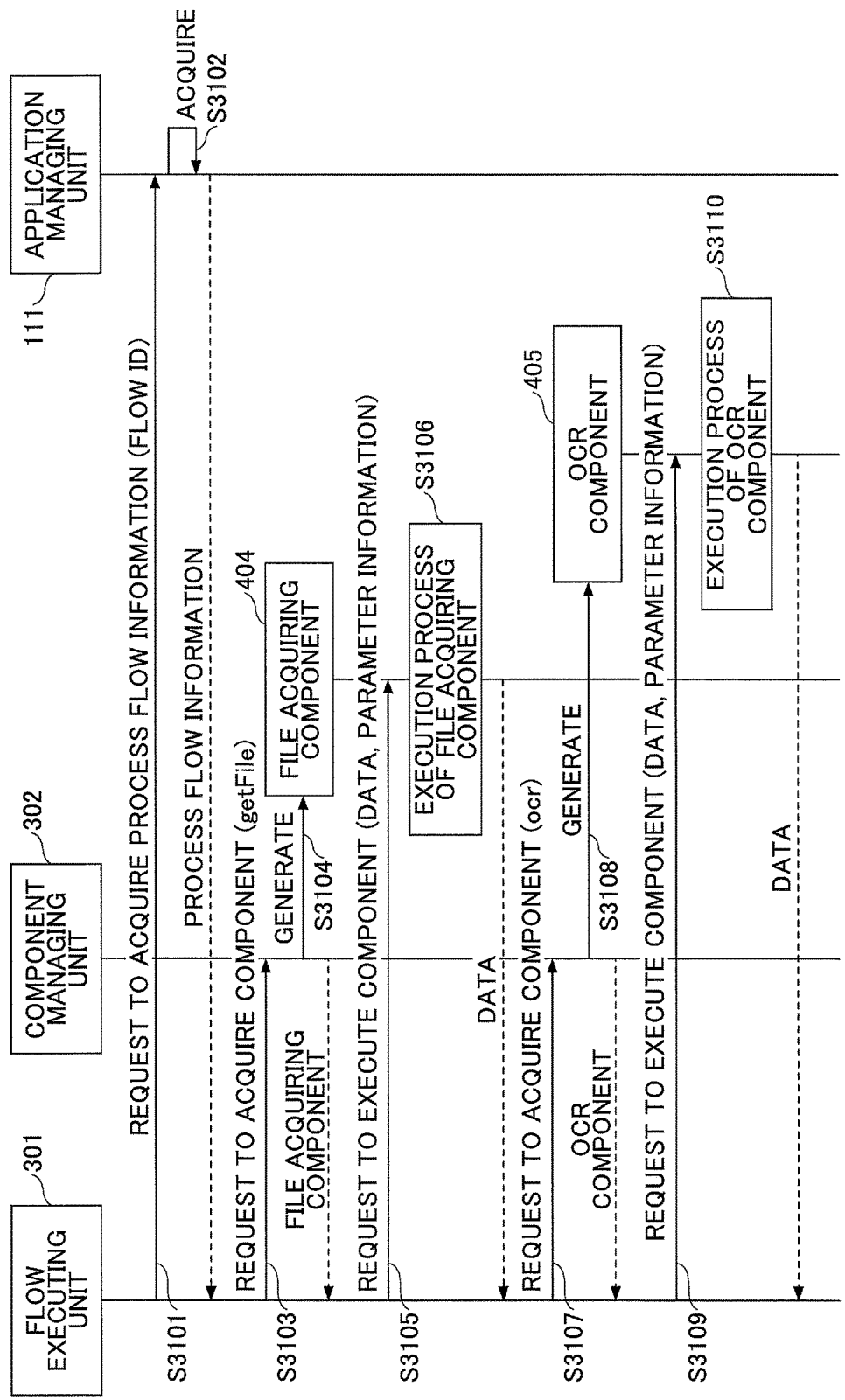
FIG. 31 is a sequence diagram of an example of the execution process of a child flow according to the second embodiment of the present invention.

Here, a description is given of the execution process of the child flow at step S3004 described above, by referring to FIG. 31. FIG. 31 is a sequence diagram of an example of the execution process of the child flow according to the present embodiment.

When the flow executing unit 301 receives the request to execute the process flow, the flow executing unit 301 sends a request to acquire process flow information to the application managing unit 111 (step S3101). Note that the acquisition request includes the flow ID indicating the parameter information included in the request to execute the process flow received from the flow execution component 406.

When the application managing unit 111 receives the request to acquire the process flow information, the application managing unit 111 acquires the process flow information 1100 corresponding to the flow ID included in the acquisition request, from the application information storage unit 150 (step S3102). Then, the application managing unit 111 returns the acquired process flow information 1100 to the flow executing unit 301. Accordingly, the process flow information 1100 illustrated in FIG. 25 is returned to the flow executing unit 301.

When the flow executing unit 301 receives the process flow information 1100 from the application managing unit 111, the flow executing unit 301 sends a request to acquire a component based on the process flow information 1100, to the component managing unit 302 (step S3103).

That is, the flow executing unit 301 sends, to the component managing unit 302, a request to acquire the file acquiring component 404 corresponding to "getFile" defined in "component" included in the process definition 1312 in the process flow information 1100 of FIG. 25.

When the component managing unit 302 receives the request to acquire a component, the component managing unit 302 generates the file acquiring component 404 (step S3104). Note that the file acquiring component 404 may be generated by using the API for generating a component defined in the component common I/F 400.

Then, the component managing unit 302 returns the generated file acquiring component 404 to the flow executing unit 301. That is, for example, the component managing unit 302 returns an address in a memory (for example, the RAM 14) in which the file acquiring component 404 is loaded, to the flow executing unit 301.

Next, the flow executing unit 301 sends a component execution request to the file acquiring component 404 (step S3105). Note that the execution request includes data and parameter information.

Here, the parameter information is "location": ${result.getFileList.url[0]} defined in "parameters" included in the process definition 1212 in the process flow information 1100 of FIG. 25.

When the file acquiring component 404 receives the component execution request, the file acquiring component 404 performs an execution process of the component (step S3106). That is, the file acquiring component 404 acquires the storage destination URL from the arrangement "url[0]" included in the processing result 171 stored in the resource management information 170D, via the resource managing unit 306. Then, the file acquiring component 404 specifies the storage destination URL at the parameter "location" included in the parameter information, and acquires (downloads) the electronic file.

Then, the file acquiring component 404 returns data indicating the processing result of the executed process, to the flow executing unit 301. Note that the data returned here includes an electronic file is that has been acquired (downloaded) from the storage destination URL specified in the parameter "location".

Accordingly, the electronic file (that is, the newest electronic file) indicated by the arrangement "url[0]" is acquired by the file acquiring component 404.

Note that in the above, a description is given of a case where the newest electronic file is acquired by the file acquiring component 404; however, the present embodiment is not so limited. For example, by defining "location": ${result.getFileList.url[N−1]} in "parameters" included in the process definition 1312, the file acquiring component 404 can acquire an electronic file indicated by the arrangement "url[N−1]" (that is, the oldest electronic file).

Next, when the flow executing unit 301 receives the data, the flow executing unit 301 sends a request to acquire a component based on the parameter information included in the request to execute the process flow received from the flow execution component 406, to the component managing unit 302 (step S3107).

That is, the flow executing unit 301 sends, to the component managing unit 302, a request to acquire the OCR component 405 corresponding to "ocr" defined in "component" included in the process definition 1322 in the process flow information 1100 of FIG. 25.

When the component managing unit 302 receives the request to acquire a component, the component managing unit 302 generates the OCR component 405 (step S3108). Note that the OCR component 405 can be generated by using the API for generating components defined in the component common I/F 400.

Then, the component managing unit 302 returns the generated OCR component 405 to the flow executing unit 301. That is, the component managing unit 302 returns an address in a memory (for example, the RAM 14) in which the OCR component 405 is loaded, to the flow executing unit 301.

Next, the flow executing unit 301 sends a component execution request to the OCR component 405 (step S3109). Note that the execution request includes data and parameter information.

Here, the parameter information is "location":"English" defined in "parameters" included in the process definition 1322 in the process flow information 1100 of FIG. 25.

When the OCR component 405 receives the component execution request, the OCR component 405 performs an execution process of the component (step S3110). That is, the OCR component 405 performs an OCR process on the electronic file included in the data. Note that the OCR component 405 executes the OCR process on the electronic file by the OCR processing unit 132 in the document service unit 130.

Then, the OCR component 405 returns data indicating the processing result of the executed process, to the flow executing unit 301. Note that the data returned here includes the electronic file that has undergone the OCR process.

As described above, in the service providing system 10 according to the present embodiment, another process flow (child flow) is executed by the flow execution component 406. Accordingly, the service providing system 10 according to the present embodiment is able to implement the calling of another process flow.

Accordingly, in the service providing system 10 according to the present embodiment, in the process flow, the processing result of another process flow can be used.

Here, a description is given of another example of the process flow information 1100 of the process flow for implementing the "OCR delivery 2" service, by referring to FIG. 32. FIG. 32 illustrates another example of the process flow information 1100 in which a process flow (parent flow) for implementing the "OCR delivery 2" service is defined.

As illustrated in FIG. 32, in "parameters" included in the process definition 1212, a parameter 1222 for determining whether to execute another process flow is defined. In the parameter 1222, "(conditional expression)" (for example, a logical formula) for executing the next process flow is defined. Accordingly, the flow execution component 406 can execute another process flow when "(conditional expression)" is satisfied, and refrain from executing another process flow when "(conditional expression)" is not satisfied.

Figure 33:
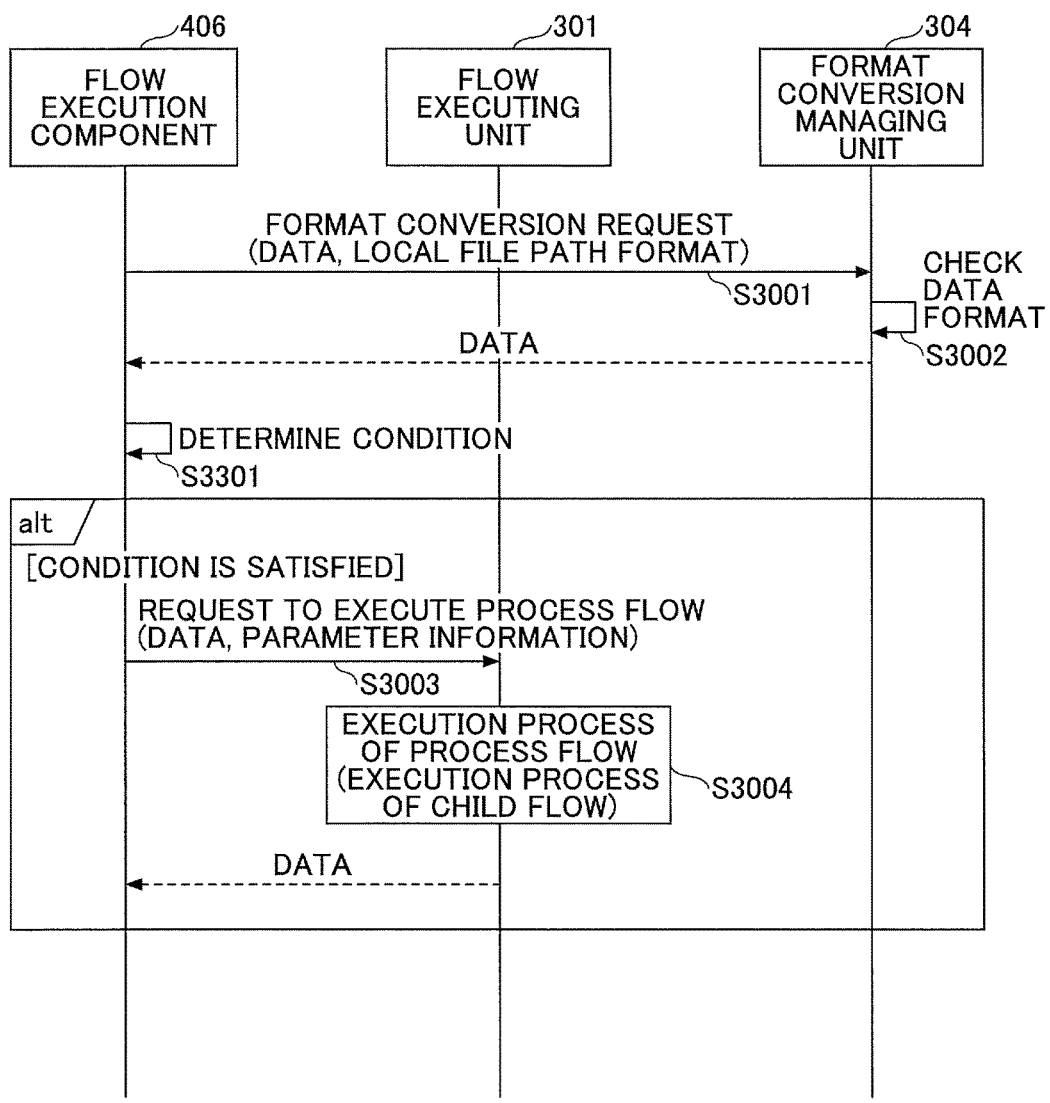
FIG. 33 is a sequence diagram of another example of the execution process of the flow execution component according to the second embodiment of the present invention.

Here, a description is given of the execution process of the flow execution component 406 in the process flow information 1100 of FIG. 32, by referring to FIG. 33. FIG. 33 is a sequence diagram of another example of the execution process of the flow execution component 406 according to the present embodiment. Note that the processes of steps S3001 through S3004 are the same as those of FIG. 30, and therefore descriptions of these processes are omitted.

After step S3002, the flow execution component 406 determines whether the "(conditional expression)" defined in the parameter 1223 is satisfied (step S3301).

In step S3301, when the flow execution component 406 determines that the "(conditional expression)" is satisfied, the flow execution component 406 executes the process of step S3003.

On the other hand, in step S3301, when the flow execution component 406 determines that the "(conditional expression)" is not satisfied, the flow execution component 406 ends the process.

Accordingly, for example, when the "(conditional expression)" is not satisfied, the flow execution component 406 can refrain from executing the child flow.

As described above, the service providing system 10 according to the present embodiment can execute another process flow in a sequence of processes for implementing a service. Therefore, the service providing system 10 according to the present embodiment can use a processing result of another sequence of processes in the sequence of processes.

Accordingly, the service providing system 10 according to the present embodiment can provide various services that are implemented by a sequence of processes that calls another sequence of processes and that uses the processing result of the other sequence of processes.

The following are notes in relation to the above descriptions.

(Note 1) An information processing system including one or more information processing apparatuses configured to implement various functions of the information processing system, the information processing system including:
   a memory configured to store
      flow information and flow identification information identifying the flow information in association with each other for each sequence of processes performed by using electronic data, the flow information defining program identification information identifying one or more programs for respectively executing the processes included in the sequence of processes, the flow information also defining an execution order of executing the one or more programs, and
   computer-executable instructions; and
   one or more processors configured to execute the computer-executable instructions such that the one or more processors execute a process including:
   receiving, over a communication channel, information relating to the electronic data and first flow identification information, from one of one or more devices coupled to the information processing system;
   acquiring first flow information stored in association with the received first flow identification information, among the flow information stored in the memory; and
   executing the sequence of processes using the electronic data based on the received information relating to the electronic data, by respectively executing the one or more programs identified by the program identification information defined in the acquired first flow information, in the execution order defined in the acquired first flow information, wherein
   when program identification information identifying a flow execution program for executing a predetermined process of calling another sequence of processes, is defined in the first flow information, the acquiring includes acquiring second flow information stored in association with second flow identification information included in the first flow information, among the flow information stored in the memory, and
   the executing includes calling and executing the other sequence of processes using the electronic data while executing the sequence of processes, by respectively executing the one or more programs identified by the program identification information defined in the acquired second flow information, in the execution order defined in the acquired second flow information.

(Note 2) The information processing system according to note 1, wherein
   when the program identification information identifying the flow execution program is defined in the first flow information, the acquiring includes acquiring the second flow information among the flow information stored in the memory, according to the flow execution program.

(Note 3) The information processing system according to note 1 or 2, wherein the executing includes converting a data format of the electronic data into a predetermined data format, and after the data format of the electronic data is converted into a data format that can be processed by the one or more programs, the one or more programs execute the processes included in the sequence of processes, to execute the sequence of processes using the electronic data.

(Note 4) The information processing system according to any one of notes 1 through 3, wherein the one or more programs include an external service program for executing a process relating to an external service, for each external service, and the external service program includes at least a program for executing a process of acquiring a storage destination address of the electronic data stored in the external service.

(Note 5) The information processing system according to any one of notes 1 through 4, wherein the execution order is an order in which the program identification information is defined in the flow information.

(Note 6) The information processing system according to any one of notes 1 through 5, wherein the flow information defines the program identification information, the execution order, and a parameter used for executing the one or more programs identified by the program identification information, and the parameter used for executing the flow execution program includes the second flow identification information.

(Note 7) The information processing system according to any one of notes 1 through 6, wherein when the execution of the other sequence of processes is ended, the executing includes respectively executing the one or more programs that are not yet executed, in the execution order, among the one or more programs identified by the program identification information defined in the first flow information, to execute one or more processes, which are subsequent to the predetermined process of calling the other sequence of processes, included in the sequence of processes.

(Note 8) An information processing apparatus including:
a memory configured to store
flow information and flow identification information identifying the flow information in association with each other for each sequence of processes performed by using electronic data, the flow information defining program identification information identifying one or more programs for respectively executing the processes included in the sequence of processes, the flow information also defining an execution order of executing the one or more programs, and
computer-executable instructions; and
one or more processors configured to execute the computer-executable instructions such that the one or more processors execute a process including:
receiving, over a communication channel, information relating to the electronic data and first flow identification information, from one of one or more devices coupled to the information processing apparatus;
acquiring first flow information stored in association with the received first flow identification information, among the flow information stored in the memory; and
executing the sequence of processes using the electronic data based on the received information relating to the electronic data, by respectively executing the one or more programs identified by the program identification information defined in the acquired first flow information, in the execution order defined in the acquired first flow information, wherein when program identification information identifying a flow execution program for executing a predetermined process of calling another sequence of processes, is defined in the first flow information, the acquiring includes acquiring second flow information stored in association with second flow identification information included in the first flow information, among the flow information stored in the memory, and the executing includes calling and executing the other sequence of processes using the electronic data while executing the sequence of processes, by respectively executing the one or more programs identified by the program identification information defined in the acquired second flow information, in the execution order defined in the acquired second flow information.

(Note 9) An information processing method executed by a computer, the information processing method being implemented in an information processing system including one or more information processing apparatuses configured to implement various functions of the information processing system, and a memory configured to store flow information and flow identification information identifying the flow information in association with each other for each sequence of processes performed by using electronic data, the flow information defining program identification information identifying one or more programs for respectively executing the processes included in the sequence of processes, the flow information also defining an execution order of executing the one or more programs, the information processing method including:

receiving, over a communication channel, information relating to the electronic data and first flow identification information, from one of one or more devices coupled to the information processing system;

acquiring first flow information stored in association with the received first flow identification information, among the flow information stored in the memory; and executing the sequence of processes using the electronic data based on the received information relating to the electronic data, by respectively executing the one or more programs identified by the program identification information defined in the acquired first flow information, in the execution order defined in the acquired first flow information, wherein when program identification information identifying a flow execution program for executing a predetermined process of calling another sequence of processes, is defined in the first flow information, the acquiring includes acquiring second flow information stored in association with second flow identification information included in the first flow information, among the flow information stored in the memory, and the executing includes calling and executing the other sequence of processes using the electronic data while executing the sequence of processes, by respectively executing the one or more programs identified by the program identification information defined in the acquired second flow information, in the execution order defined in the acquired second flow information.

According to one embodiment of the present invention, a sequence of processes including iteration can be executed.

The information processing system, the information processing apparatus, and the information processing method are not limited to the specific embodiments described in the detailed description, and variations and modifications may be made without departing from the spirit and scope of the present invention.

What is claimed is:

1. An information processing system including one or more information processing apparatuses configured to implement various functions of the information processing system, the information processing system comprising:
a memory configured to store
flow information and flow identification information identifying the flow information in association with each other for each sequence of processes performed by using electronic data, the flow information defining first program identification information identifying one or more programs for respectively executing the processes included in the sequence of processes, the flow information also defining a first execution order of executing the one or more programs, said flow information having an iteration component for repeatedly executing at least one of the one or more processes, a parameter that includes a number of times of repeating the at least one of the one or more processes, and a parameter list of parameter information wherein each parameter information in the parameter list corresponds to a different iteration of sequence of iterations of the repeated execution of the at least one of the one or more processes; and
computer-executable instructions; and
one or more processors configured to execute the computer-executable instructions such that the one or more processors execute the processes including:
receiving, over a communication channel, information relating to the electronic data as a target of the sequence of processes and receiving the flow identification information, from one of one or more devices coupled to the information processing system;
acquiring the flow information stored in association with the received flow identification information, among the flow information stored in the memory; and
executing the sequence of processes using the electronic data based on the information relating to the electronic data, by respectively executing the one or more programs identified by the first program identification information defined in the acquired flow information, in the first execution order defined in the acquired flow information, wherein
when the sequence of processes includes the iteration of the repeated execution of the at least one of the one or more processes, the executing includes repeatedly executing each different iteration of the repeated execution of the at least one of the one or more processes according to a condition of each different iteration of the repeated execution as defined by the parameter information corresponding to each different iteration of the repeated execution, and
wherein the processes includes dynamically changing a number of the iteration.

2. The information processing system according to claim 1, wherein
when the flow information defines second program identification information identifying the one or more programs for respectively executing another set of the one or more processes to be iterated, a second execution order of executing the one or more programs by using the second program identification information, for respectively executing the another set of the one or more processes to be to be iterated, and another condition of the iteration of the another set of the one or more processes,
the executing includes repeatedly executing the another set of the one or more processes to be iterated, by respectively executing the one or more programs identified by the second program identification information defined in the flow information, in the second execution order, according to the another condition of the iteration.

3. The information processing system according to claim 1, wherein
the one or more programs include an iteration program for repeatedly executing the one or more processes to be iterated, and
when the flow information defines the first program identification information identifying the iteration program, the executing includes repeatedly executing the one or more processes by the iteration program, according to the condition of the iteration.

4. The information processing system according to claim 1, wherein
the executing includes converting a data format of the electronic data into a predetermined data format, and
after the data format of the electronic data is converted into a data format that can be processed by the one or more programs, the one or more programs execute the processes included in the sequence of processes, to execute the sequence of processes using the electronic data.

5. The information processing system according to claim 1, wherein
the one or more programs include a program for executing a process relating to an external service, and
the program for executing the process relating to the external service includes at least a program for executing a process of acquiring a storage destination address of the electronic data stored in the external service.

6. An information processing apparatus comprising:
a memory configured to store
flow information and flow identification information identifying the flow information in association with each other for each sequence of processes performed by using electronic data that is separately received from the flow identification information as a target of the sequence of the processes, the flow information defining program identification information identifying one or more programs for respectively executing the processes included in the sequence of processes, the flow information also defining an execution order of executing the one or more programs, said flow information having an iteration component for repeatedly executing at least one of the one or more processes, a parameter that includes a number of times of repeating the at least one of the one or more processes, and a parameter list of parameter information wherein each parameter information in the parameter list corresponds to a different iteration of sequence of iterations of the repeated execution of the at least one of the one or more processes; and
computer-executable instructions; and
one or more processors configured to execute the computer-executable instructions such that the one or more processors execute the processes a process including:

receiving, over a communication channel, information relating to the electronic data used in the sequence of processes and the flow identification information, from one of one or more devices coupled to the information processing apparatus;

acquiring the flow information stored in association with the received flow identification information, among the flow information stored in the memory; and executing the sequence of processes using the electronic data based on the information relating to the electronic data, by respectively executing the one or more programs identified by the program identification information defined in the acquired flow information, in the execution order defined in the acquired flow information, wherein when the sequence of processes includes the iteration of the repeated execution of the at least one of the one or more processes, the executing includes repeatedly executing each different iteration of the repeated execution of the at least one of the one or more processes according to a condition of each different iteration of the repeated execution as defined by the parameter information corresponding to each different iteration of the repeated execution, and wherein the processes includes dynamically changing a number of the iteration.

7. An information processing method executed by a computer, the information processing method being implemented in an information processing system including one or more information processing apparatuses configured to implement various functions of the information processing system, and a memory configured to store flow information and flow identification information identifying the flow information in association with each other for each sequence of processes performed by using electronic data that is separately received from the flow identification information as a target of the sequence of the processes, the flow information defining program identification information identifying one or more programs for respectively executing the processes included in the sequence of processes, the flow information also defining an execution order of executing the one or more programs, said flow information having an iteration component for repeatedly executing at least one of the one or more processes, a parameter that includes a number of times of repeating the at least one of the one or more processes, and a parameter list of parameter information wherein each parameter information in the parameter list corresponds to a different iteration of sequence of iterations of the repeated execution of the at least one of the one or more processes; the information processing method comprising:

receiving, over a communication channel, information relating to the electronic data used in the sequence of processes and the flow identification information, from one of one or more devices coupled to the information processing system;

acquiring the flow information stored in association with the received flow identification information, among the flow information stored in the memory; and executing the sequence of processes using the electronic data based on the information relating to the electronic data, by respectively executing the one or more programs identified by the program identification information defined in the acquired flow information, in the execution order defined in the acquired flow information, wherein when the sequence of processes includes the iteration of the repeated execution of the at least one of the one or more processes, the executing includes repeatedly executing each different iteration of the repeated execution of the at least one of the one or more processes according to a condition of each different iteration of the repeated execution as defined by the parameter information corresponding to each different iteration of the repeated execution, and wherein the processes includes dynamically changing a number of the iteration.

8. The information processing system according to claim 1, wherein the number of times of the iteration of the at least one of the one or more processes is dynamically changed to a particular number by changing the parameter.

9. The information processing system according to claim 1, wherein, the iteration of the at least one of the one or more processes is performed based on a result of a process that is performed the last time.

10. The information processing system according to claim 1, wherein the process further includes skipping a next iteration of the at least one of the one or more processes when the iteration component does not satisfy a conditional expression.

11. The information processing system according to claim 1, wherein the parameter information includes location information indicating a location from which the one or more processors retrieve the electronic data.

* * * * *